United States Patent [19]

Nowlin

[11] Patent Number: 4,593,009

[45] Date of Patent: Jun. 3, 1986

[54] CATALYST COMPOSITION FOR POLYMERIZING ALPHA-OLEFINS

[75] Inventor: Thomas E. Nowlin, Yanbu, Saudi Arabia

[73] Assignee: Mobil Oil Corporation, New York, N.Y.

[21] Appl. No.: 596,777

[22] Filed: Apr. 4, 1984

[51] Int. Cl.[4] ............................ C08F 4/64; C08F 4/68
[52] U.S. Cl. .................... 502/107; 502/104; 502/113; 502/120; 502/132; 526/116; 526/129; 526/156
[58] Field of Search ............... 502/104, 107, 113, 120, 502/132

[56] References Cited

U.S. PATENT DOCUMENTS

| | | | |
|---|---|---|---|
| 3,135,809 | 6/1964 | Bosmajian | 502/103 X |
| 3,787,384 | 1/1974 | Stevens et al. | 260/94.9 |
| 4,063,009 | 12/1977 | Ziegler et al. | 526/159 |
| 4,076,698 | 2/1978 | Anderson et al. | 526/348.6 |
| 4,105,846 | 8/1978 | Hoff et al. | 526/124 |
| 4,128,502 | 12/1978 | Kildahl et al. | 252/431 |
| 4,148,754 | 4/1979 | Strobel et al. | 252/429 |
| 4,173,547 | 11/1979 | Graff | 502/110 |
| 4,199,476 | 4/1980 | Melquist et al. | 252/431 |
| 4,245,071 | 1/1981 | Kondo et al. | 526/114 |
| 4,296,223 | 10/1981 | Berger | 526/125 |
| 4,302,566 | 11/1981 | Karol et al. | 526/125 |
| 4,333,851 | 6/1982 | Speakman et al. | 502/113 |
| 4,451,574 | 5/1984 | Johnson | 502/115 |
| 4,458,058 | 7/1984 | Dombro | 526/129 |
| 4,481,301 | 11/1984 | Nowlin et al. | 502/104 |

FOREIGN PATENT DOCUMENTS 0081940 11/1982 European Pat. Off. .

*Primary Examiner*—Patrick P. Garvin
*Attorney, Agent, or Firm*—Alexander J. McKillop; Michael G. Gilman; Stanislaus Aksman

[57] ABSTRACT

A catalyst composition for polymerizing alpha-olefins is prepared by treating a carrier containing OH groups with an organomagnesium composition and contacting the thus-formed magnesium-containing carrier with a solution of at least one tetravalent vanadium compound. Alternatively, the solution may also contain at least one tetravalent titanium compound in addition to the vanadium compound, thereby producing catalysts containing both, vanadium and titanium. Also disclosed is a process for polymerizing alpha-olefins in the presence of the catalysts of the invention.

58 Claims, 7 Drawing Figures

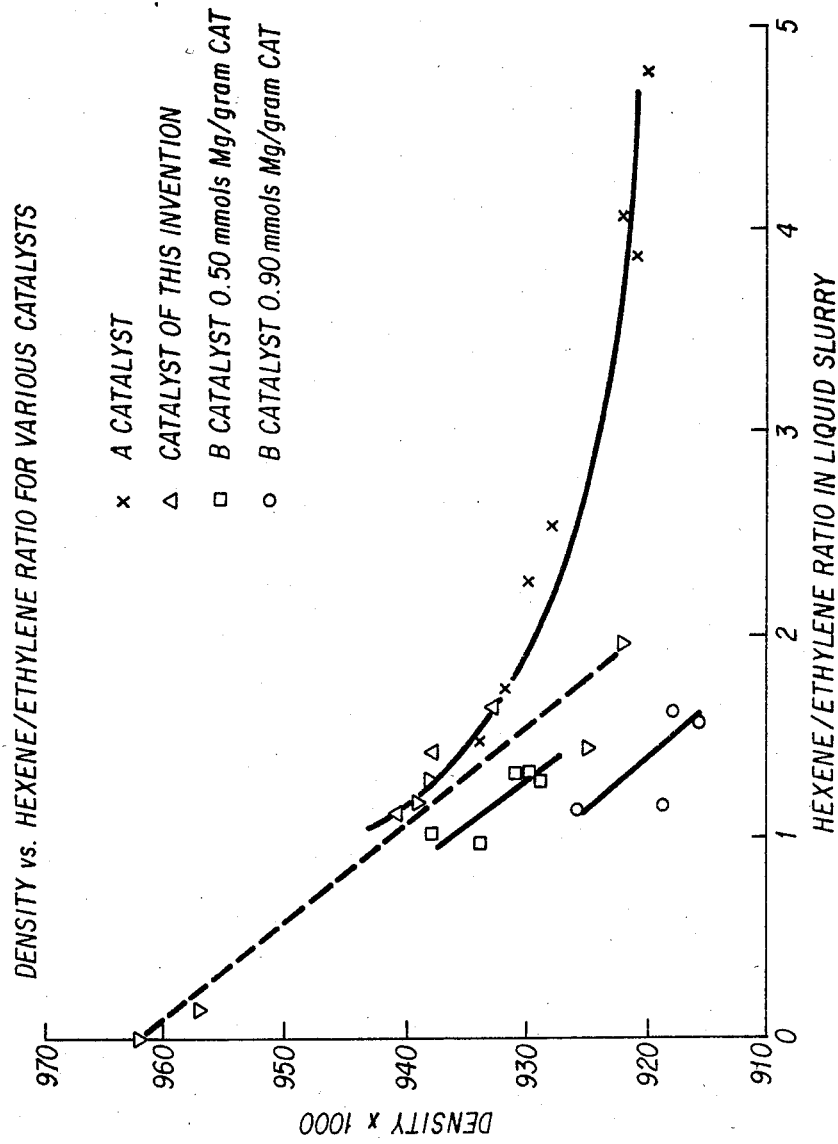

CATALYST COMPOSITION FOR POLYMERIZING ALPHA-OLEFINS

BACKGROUND OF THE INVENTION

1. Field of the Invention

The present invention relates to a method for polymerizing alpha-olefins, a catalyst for such a polymerization method and a method for producing such a catalyst. A particular aspect of the present invention relates to a method for preparing a catalyst which produces linear low density polyethylene (LLDPE) and high density polyethylene (HDPE) having a relatively broad distribution of melt flow ratios (MFR).

2. Description of the Prior Art

Linear low density polyethylene polymers possess properties which distinguish them from other polyethylene polymers, such as homopolymers of polyethylene. Certain of these properties are described in Anderson et al, U.S. Pat. No. 4,076,698.

Karol et al, U.S. Pat. No. 4,302,566, describes a process for producing certain linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Strobel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound appears to be present when the reacted support is contacted with the tetravalent titanium compound.

Ziegler, deceased, et al, U.S. Pat. No. 4,063,009, describes a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum, as a co-catalyst, is disclosed by W. L. Carrick et al in *Journal of American Chemical Society*, Volume 82, page 1502 (1960) and Volume 83, page 2654 (1961).

A majority of the aforementioned patents wherein an organomagnesium compound, a tetravalent titanium compound and/or a tetravalent vanadium compound are used to produce catalysts for polymerization of ethylene alone or in combination with 1-olefins (also known as alpha-olefins), teach the necessity of using only such amounts of the organomagnesium compounds that are necessary to react with the hydroxyl (OH) groups on the carrier. The catalysts produced in accordance with the teachings of the aforementioned patents yield polyethylene polymers having relatively narrow molecular weight distribution, as evidenced by relatively narrow melt flow ratio (MFR) values.

Accordingly, it is a primary object of the present invention to prepare a catalyst for polymerization of alpha-olefins which yields products of a relatively broad molecular weight distribution with very high activity in the absence of chlorine-containing modifiers.

It is an additional object of the present invention to provide a catalytic process for polymerizing alpha-olefins which yields linear low density polyethylene or high density polyethylene of a relatively broad molecular weight distribution.

SUMMARY OF THE INVENTION

A process for preparing a supported catalyst composition for use in alpha-olefin polymerization reactions comprises the steps of:

(i) contacting a solid, porous carrier having reactive OH groups with a liquid, said liquid containing at least one organomagnesium composition having the empirical formula $$R_n MgR'_{(2-n)} \qquad (I)$$

where R and R' are the same or different and they are $C_1$–$C_{12}$ hydrocarbyl groups, provided that R' may also be halogen, and n is 0, 1 or 2, the number of moles of said organomagnesium composition being in excess of the number of moles of OH groups on said carrier;

(ii) removing said liquid from step (i) to obtain a magnesium-containing carrier in the form of a dry, free-flowing powder; and (iii) contacting said powder of step (ii) with a solution comprising a liquid medium and at least one tetravalent vanadium compound, said vanadium compound being soluble in said liquid medium, and said magnesium-containing carrier being essentially insoluble in said liquid medium, whereby a compound of vanadium which is insoluble in said liquid medium becomes incorporated onto said carrier.

The present invention also relates to a process for preparing a supported catalyst composition for use in alpha-olefin polymerization reactions, said process comprising the steps of:

(i) contacting silica carrier having from about 0.1 to about 2.0 mmoles/g of OH groups with a liquid, said liquid containing at least one organomagnesium composition having the empirical formula $$RMgR' \qquad (II)$$

where R is a $C_1$–$C_{12}$ hydrocarbyl group and R' is halogen, at least a portion of said organomagnesium composition being soluble in said liquid medium, the ratio of the number of moles of said organomagnesium composition to the number of moles of OH groups on said carrier being from about 1.1 to about 3.5;

(ii) removing said liquid from step (i) to incorporate magnesium onto said carrier, said incorporated magnesium being selected from the group consisting of magnesium halide, unreacted organomagnesium composition and mixtures thereof, whereby a magnesium-containing carrier composition in the form of a dry, free-flowing powder is formed; and (iii) contacting said powder of step (ii) with a solution comprising a liquid medium and at least one tetravalent vanadium compound, the number of moles of said vanadium compound being in excess of the stoichiometric amount thereof, said vanadium compound being soluble in said liquid medium, and said magnesium-containing carrier being essentially insoluble in said liquid medium, whereby a compound of vanadium which is insoluble in said liquid medium becomes incorporated onto said carrier.

The present invention further relates to a process for preparing a copolymer of ethylene and one or more $C_3$-$C_{10}$ alpha olefins having a density of about 0.910 to about 0.970 gr/cc, said process comprising conducting the polymerization in the presence of a catalyst prepared by a process comprising the steps of:

(i) contacting a solid, porous carrier having reactive OH groups with a liquid, said liquid containing at least one organomagnesium composition having the empirical formula

$$R_n MgR'_{(2-n)} \quad \quad (I)$$

where R and R' are the same or different and they are $C_1$-$C_{12}$ hydrocarbyl groups, provided that R' may also be halogen, and n is 0, 1 or 2, the number of moles of said organomagnesium composition being in excess of the number of moles of OH groups on said carrier;

(ii) removing said liquid from step (i) to obtain a magnesium-containing carrier in the form of a dry, free-flowing powder; and (iii) contacting said powder of step (ii) with a solution comprising a liquid medium and at least one tetravalent vanadium compound, said vanadium compound being soluble in said liquid medium, and said magnesium-containing powder being essentially insoluble in said liquid medium, whereby a compound of vanadium which is insoluble in said liquid medium becomes incorporated onto said carrier.

The present invention further relates to a process for preparing a copolymer of ethylene and one or more $C_3$-$C_{10}$ alapha-olefins having a density of about 0.910 to about 0.970 gr/cc, said process comprising conducting the polymerization in a gas phase, fluid bed reactor in the presence of a catalyst produced by a process comprising the steps of:

(i) contacting silica carrier having from about 0.1 to about 2.0 mmoles/g of OH groups with a liquid, said liquid containing at least one organomagnesium composition having the empirical formula

$$RMgR' \quad \quad (II)$$

where R is a $C_1$-$C_{12}$ hydrocarbyl group and R' is halogen, at least a portion of said organomagnesium composition being soluble in said liquid medium, the ratio of the number of moles of said organomagnesium composition to the number of moles of OH groups on said carrier being from about 1.1 to about 3.5;

(ii) removing said liquid from step (i) to incorporate magnesium onto said carrier, said incorporated magnesium being selected from the group consisting of magnesium halide, unreacted organomagnesium composition and mixtures thereof, whereby a magnesium-containing carrier in the form of a dry, free-flowing powder is formed; and (iii) contacting said powder of step (ii) with a solution comprising a liquid medium and at least one tetravalent vanadium compound, the number of moles of said vanadium compound being in excess of the stoichiometric amount thereof, said vanadium compound being soluble in said liquid medium, and said magnesium-containing carrier being essentially insoluble in said liquid medium, whereby a compound of vanadium which is insoluble in said liquid medium becomes incorporated onto said carrier.

In an alternative embodiment, the catalyst may also comprise a tetravalent titanium (Ti) compound, in addition to the tetravalent vanadium compound. The tetravalent titanium compound is incorporated into the catalyst by any suitable means, e.g., by admixing the desired amount thereof with the tetravalent vanadium compound in the solution used in step (iii) to contact the powder of step (ii).

BRIEF DESCRIPTION OF THE DRAWINGS

FIG. 7 is a graph comparing density as a function of hexene/ethylene ratio for various catalysts.

DETAILED DESCRIPTION OF THE INVENTION

Figure 1:
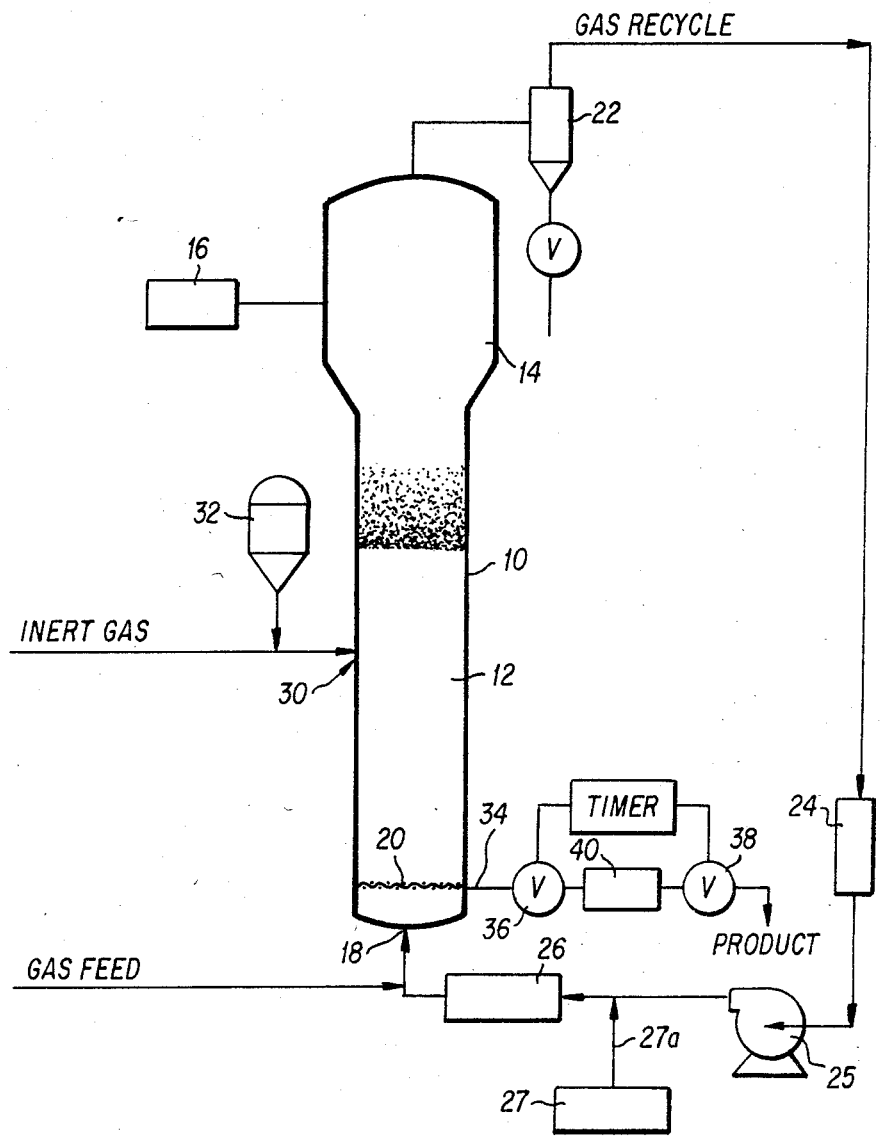
FIG. 1 is a diagrammatic illustration of a fluid bed process for producing polyethylene, such as linear low density polyethylene (LLDPE).

In accordance with the present invention, at least one tetravalent vanadium compound is incorporated onto a suitable carrier (or support) by contacting the support with an organomagnesium compound and reacting the thus-obtained magnesium-containing support with a tetravalent vanadium compound in a liquid medium. Unreacted vanadium is soluble in this liquid medium, while reacted vanadium and the magnesium-containing support are insoluble in this liquid medium.

In an alternative embodiment, at least one tetravalent titanium compound is incorporated along with the tetravalent vanadium compound onto a suitable magnesium-containing support.

As used herein, the concept of incorporating a material onto a carrier is intended to connote the incorporation of the material (e.g., magnesium compositions, vanadium compositions and/or titanium compositions) onto the carrier by physical or chemical means. Accordingly, the incorporated material need not necessarily be chemically bound to the carrier.

Catalysts produced according to the present invention are described below in terms of the manner in which they are made.

Suitable carrier materials which may be used herein include solid, porous carrier materials, such as silica, alumina and combinations thereof, which contain reactive OH groups. A suitable carrier is a material which, when it is contacted with a liquid containing the organomagnesium composition, contains water as represented by hydroxyl (OH) groups, in the amount of about 0.1 mmoles or more of OH groups per gram of carrier, preferably about 0.1 to about 2.0 mmoles of OH groups per gram of carrier, and most preferably about 0.3 to about 0.7 mmoles of OH groups per gram of carrier. Such carrier materials may be amorphous or crystalline in form.

Examples of suitable carrier materials are described in Graff, U.S. Pat. No. 4,173,547, the entire contents of which are incorporated herein by reference. Of particular interest is the passage extending from column 3, line 62 to column 5, line 44 of this Graff patent. Internal porosity of carriers can be determined by a technique termed BET-technique, described by S. Brunauer, P. Emmett and E. Teller in *Journal of the American Chemical Society*, 60, pp. 209-319 (1938). Specific surface areas of carriers can also be measured in accordance with the aforementioned BET-technique, with the use of the standardized method, as described in *British Standards* BS 4359, Volume 1, (1969).

Further examples of suitable carrier materials are given in Stevens et al., U.S. Pat. No. 3,718,636, the entire contents of which are incorporated herein by reference. Of particular interest is the passage extending from line 12 to line 29 of column 3 of this Stevens et al patent. Polymeric silicas known as polysiloxanes can also be used as suitable carrier materials.

These carrier materials may be in the form of particles having a particle size of from about 0.1 micron to about 200 microns, more preferably from about 10 to about 150 microns. Preferably, the carrier is in the form of spherical particles, e.g., spray dried silica. The internal porosity of these carriers is larger than 0.2 cm$^3$/gr, preferably larger than about 0.6 cm$^3$/gr. The specific surface area of these carriers is larger than about 50 m$^2$/gr, preferably from about 150 to about 1500 m$^2$/gr. In the most preferred embodiment, the carrier is silica which has been dehydrated by fluidizing with nitrogen and heating at about 800° C. for about 16 hours to achieve a surface hydroxyl concentration of about 0.4 mmols/gr. The silica of the most preferred embodiment is a high surface area, amorphous silica (surface area=300 m$^2$/gr; pore volume of 1.65 cm$^3$ per gram), and it is a material marketed under the tradename of Davison 952 by the Davison Chemical Division of W. R. Grace and Company. The silica is in the form of spherical particles, e.g., as obtained by a spray-drying process. It is desirable to remove physically bound water from the carrier material prior to contacting this material with water-reactive magnesium compounds. This water removal may be accomplished by heating the carrier material to a temperature of from about 100° C. to an upper limit of temperature represented by the temperature at which change of state or sintering occurs. A suitable range of temperatures is, from about 100° C. to about 1000° C., preferably from about 150° C. to about 850° C., yet more preferably from about 750° C. to about 850° C. and most preferably about 800° C.

Chemically bound water, e.g., as represented by the presence of the OH groups in the carrier, may be present when the carrier is contacted with water-reactive organomagnesium compounds in accordance with the present invention. Excess OH groups present in the carrier may be removed by heating the carrier, prior to the contacting step, for a sufficient time at a sufficient temperature to accomplish the desired degree of the OH groups removal. For example, a relatively small number of OH groups may be removed by sufficient heating at from about 150° C. to about 250° C., whereas a relatively large number of OH groups may be removed by sufficient heating of at least 500° or 600° C., preferably from about 750° C. to about 850° C. The heating is continued for about 4 to about 16 hours. The amount of the hydroxyl groups in silica may be determined according to the method disclosed by J. B. Peri and A. L. Hensley, Jr., in *J. Phys. Chem.*, 72 (8), 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

A dehydrated carrier material is treated with a solution of a solid organomagnesium composition in a liquid, the organomagnesium composition being capable of reacting with a tetravalent vanadium compound. If an alternative embodiment of the invention is practiced, the organomagnesium composition must be capable of reacting with a tetravalent vanadium and a tetravalent titanium compound. The organomagnesium composition has the formula $R_n MgR'_{(2-n)}$, where R and R' are the same or different and they are $C_1$-$C_{12}$ hydrocarbyl groups, preferably $C_1$-$C_4$ alkane groups, and yet more preferably $C_2$-$C_4$ alkane groups, provided that R' may also be halogen, preferably bromine or chlorine, and most preferably chlorine, and n is a 0, 1 or 2. In the preferred embodiment, a solution of such an organomagnesium composition is a Grignard reagent and the carrier material is contacted with the solution thereof in the absence of ball milling.

Grignard reagents are described in *Organic Chemistry*, Second Edition, Morrison and Boyd, Second Edition, fifth printing, May 1968, pp. 112-114 and 516-521, the entire contents of which are incorporated herein by reference. Grignard reagents are known to react with organic molecules or moieties which have hydrogen bonded directly to a nitrogen or oxygen atom. Furthermore, Grignard reagents are also known to react with organic molecules or moieties containing carbonyl groups, cyano groups and nitro groups. Accordingly, the groups defined by R in the above-mentioned formula generally should not be any of the aforementioned groups indicated as being reactive with Grignard reagents. Examples of R and R' include $C_1$-$C_{12}$ hydrocarbyl groups (e.g., $C_1$-$C_{12}$ alkyl or $C_6$-$C_{12}$ aryl) or $C_1$-$C_{12}$ alkoxy groups, which may be unsubstituted or substituted, e.g., with one or more halogens (e.g., F, Cl, Br or I), or with $C_1$-$C_{12}$ alkoxy groups. In the most preferred embodiment, ethylmagnesium chloride is the compound represented by the formula $R_n MgR'_{(2-n)}$.

It is noted that even a Grignard reagent of ethylmagnesium chloride may contain a mixture of molecules other than ethylmagnesium chloride, per se. For example, particularly under the influence of various liquids or solvent systems, ethylmagnesium chloride may disproportionate to form essentially a mixture of magnesium dichloride and diethylmagnesium. Such mixtures are intended to be encompassed within the formula $R_n MgR'_{(2-n)}$. Accordingly, it will be understood that compositions of the formula $R_n MgR'_{(2-n)}$ and compositions representative thereof are intended herein to represent the overall empirical formula of these compositions rather than to set forth the molecular formula of these compositions.

Preferably, the carrier is treated with the aforementioned solution in such a manner that, after the treatment is completed, the carrier has magnesium incorporated into the pores thereof. A preferred means of accomplishing this result is by adding a porous carrier to a liquid medium containing a dissolved organomagnesium composition of the formula $R_n MgR'_{(2-n)}$ and to maintain it in the suspension for about 0.1 to about 10, preferably about 0.5 to about 5, and most preferably for about 1.0 to about 2.0 hours (hrs) at a temperature of about 25 to about 200, preferably about 50 to about 100, and most preferably about 60° to about 80° C. As a result of this treatment, magnesium becomes incorporated into the pores of the carrier by (1) a chemical reaction of the organomagnesium composition with the carrier, by (2) a precipitation of magnesium from the organomagnesium composition onto the carrier or by (3) a combination of such a reaction and precipitation.

Organomagnesium compositions corresponding to those found in Grignard reagents have the formula RMgX, where R is as defined hereinabove and X is halogen (e.g., Cl, Br or I), and they are soluble in ethers. Suitable ethers are known in the art, e.g., see Yamaguchi et al, U.S. Pat. No. 3,989,881, column 4, lines 32–49, the entire contents of this patent being incorporated herein by reference, and include aliphatic ethers, such as diethyl ether, diisopropyl ether, dibutyl ether, dipentyl ether and ethyl-n-butyl ether; and cyclic ethers, such as tetrahydrofuran and dioxane. Without wishing to be bound by any theory of operability, it is theorized that the reason for the ability of such ethers (e.g. diethyl ether) ot solubilize such organomagnesium compositions (e.g., $C_2H_5MgCl$) is by virtue of the ability of the magnesium atom to act as a Lewis acid and to associate with at least one electron pair from the etheric oxygen which acts as a Lewis base. Such an association is represented as follows:

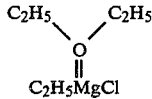

Thus, the liquid medium containing the organomagnesium composition is usually an ether, preferably tetrahydrofuran. Although organomagnesium compounds of the formula RMgX tend to be insoluble in non-Lewis base solvents, such as hexane, these organomagnesium compounds may be completely soluble in mixed solvent systems such as hexane/tetrahydrofuran, provided that a sufficient solubilizing amount of the Lewis base solvent is present. Thus, according to one aspect of the present invention, a carrier may be slurried in a non-Lewis base co-solvent and an organomagnesium compound may be added thereto in the form of an ether solution thereof. Suitable non-Lewis base co-solvents are also known in the art, see e.g., Graff, U.S. Pat. No. 4,173,547, column 6, line 61 to column 7, line 8. These co-solvents include straight or branched saturated aliphatic hydrocarbons, such as butanes, pentanes, hexanes, heptanes, or commonly available mixtures thereof, generally known as gasoline, kerosene, gas, oil or other petroleum fractions. Further, such co-solvents include cyclic hydrocarbons, such as cyclopentane, cyclohexane, methylcyclohexane, as well as aromatic hydrocarbons, such as benzene or halogen-aromatic hydrocarbons, such as chlorobenzene. It is noted that such co-solvents should preferably not contain groups which are reactive with the organomagnesium composition. A preferred co-solvent is n-hexane.

The amounts and concentrations of the organomagnesium/ether solution which is added to the co-solvent/carrier slurry are preferably sufficient to assure that the organomagnesium composition is at least partially soluble in the co-solvent/solvent system. Thus, this amount is dependent upon many factors, such as the composition of solvents, the organomagnesium composition and the temperature of the co-solvent/solvent system. The selection of proper amounts and concentrations of organomagnesium/ether solutions is well within the skill of those of ordinary skill in the art. For example, when an ethylmagnesium chloride/tetrahydrofuran solution is added to a hexane/carrier slurry, the concentration of the ethylmagnesium chloride/tetrahydrofuran solution may be from about 0.1 to about 10 Molar, preferably from about 1 to about 3 Molar.

For example, when 107 g of silicic acid are suspended in 500 ml of n-heptane and 342 ml of a solution of 172 mmols of n-propyl magnesium chloride in diethyl ether are added thereto in accordance with Example 1 of Strobel et al, U.S. Pat. No. 4,148,754, the n-propyl magnesium chloride may well be totally soluble in the n-heptane/diethyl ether mixture. However, when 15 g of silica are slurried in 200 ml of n-hexane and 50 ml of a 2.0 molar solution of ethylmagnesium chloride in tetrahydrofuran is added thereto, the ethylmagnesium chloride appears to be only partially soluble in the n-hexane/tetrahydrofuran mixture.

A carrier material may also be incorporated with an organomagnesium composition by suitably contacting this carrier material with a liquid containing an organomagnesium composition of the formula $R_n MgR'_{(2-n)}$ in a partially dissolved state. More particularly, the carrier material may be slurried in one of the above-exemplified non-Lewis base co-solvents, such as hexane, and a solution of an organomagnesium composition in a liquid, such as ether, may be added thereto, the amount of the liquid relative to the amount of co-solvent being sufficient to only partially solubilize the organomagnesium composition. The non-soluble portion of the organomagnesium composition may be in the form of a halomagnesium, e.g., dihalomagnesium, the amount of this non-soluble halomagnesium being essentially equivalent to an amount of dialkylmagnesium remaining soluble in the solvent/co-solvent mixture.

It is noted that if the organomagnesium composition is only sparingly soluble in the liquid, e.g., to the extent of about 1 percent or less, reactive organomagnesium composition which is consumed by reactive sites on the carrier will be replaced by further dissolution of undissolved organomagnesium composition by a mass action effect.

Another example of a method of incorporating an organomagnesium composition onto a carrier material is to slurry the carrier material in a Lewis base solvent, such as an ether, and to add a solution of organomagnesium composition in ether to this slurry. The addition of organomagnesium/ether solution to ether or co-solvent/carrier slurry usually takes place as a gradual continuous dropwise addition while the liquid medium of the slurry is maintained under reflux conditions. Without wishing to be bound by any operability theory, it is thought that, upon such addition, dissolved organomagnesium composition may react with the carrier at the site of reactive OH groups, if any, present on the available surface area of the carrier. Such a reaction may be described with respect to ethylmagnesium chloride as follows:

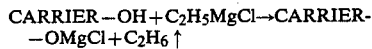

CARRIER—OH+C$_2$H$_5$MgCl→CARRIER-
—OMgCl+C$_2$H$_6$↑

Accordingly, it may be possible to incorporate an organomagnesium composition onto a carrier by reacting an organomagnesium composition with reactive OH groups of the carrier.

Another means of incorporating a magnesium composition onto a carrier is to precipitate a magnesium compound or compounds from an organomagnesium composition from a liquid solvent onto a carrier. This precipitation may take place by any possible convenient means, including cooling of the solvent, using a sufficiently large amount of non-solvent in the initial slurry to precipitate the magnesium compound(s) within the carrier, adding non-solvent to the slurry to cause the precipitation of the magnesium compound(s) within the carrier, or stripping of solvent. In the case of a carrier slurry where the liquid solvent is essentially a hexane/tetrahydrofuran solution of ethylmagnesium chloride, it is preferred to precipitate ethylmagnesium chloride onto the carrier by distillation of the solvent. In this regard, it is noted that tetrahydrofuran and hexane have nearly equivalent boiling points. Thus, it would be expected that during the course of distilling these solvents, the ratio of tetrahydrofuran to hexane in the liquid state would remain essentially constant. On the other hand, if the boiling point of the co-solvent is significantly greater than the boiling point of the ether, then the relative concentration of the co-solvent may increase appreciably as the distillation proceeds. In such a case, a non-uniform precipitation of a magnesium compound may occur, such that any magnesium halide, e.g., magnesium dihalide, which may be present tends to precipitate before organomagnesium is precipitated.

In view of the above discussion, it will be understood that at least three possible types of magnesium-containing compounds on the carrier can be obtained. The first type is essentially one or more reaction product of an organomagnesium composition with a carrier having OH functionalities which are reactive with this organomagnesium composition. This product contains essentially no precipitated magnesium compound(s). Examples of such reaction produdts are given in the aforementioned Stevens et al U.S. Pat. No. 3,787,384 and Strobel et al U.S. Pat. No. 4,148,754.

A second type of product is essentially one or more magnesium compound which is incorporated onto the carrier by means other than those mentioned above, i.e., it is not a reaction product of an organomagnesium composition with a carrier having reactive OH functionalities. This product contains essentially no reaction product of an organomagnesium composition with the carrier. Such a product is obtained when an organomagnesium composition is precipitated onto a carrier having essentially no OH functionalities reactive with the organomagnesium composition.

A third type of product contains both, one or more reaction product(s) of an organomagnesium composition with the carrier and precipitated organomagnesium composition(s). Such a product is obtained when an excess of organomagnesium composition, with respect to the OH functionalities, is reacted with a carrier containing such reactive OH functionalities.

Accordingly, magnesium-containing compounds may be incorporated onto a carrier in either an unreacted form or in a reacted form or a combination of both forms. Without wishing to be bound by any theory of operability, it is believed that the reactive form of the magnesium-containing compound is obtained by the reaction of reactive hydroxyl groups of the carrier with an organomagnesium composition. However, regardless of the possible mechanism of incorporating the magnesium-containing compound and the carrier, it is important for the purposes of the present invention that the number of moles of the organomagnesium composition in the solution used to contact the carrier be in excess of the number of moles of OH groups on the carrier, so that the molar ratio of the organomagnesium composition be in the solution to the hydroxyl groups is greater than 1.0, preferably it is from about 1.1 to about 3.5, and most preferably from about 2.0 to about 3.5.

It is almost important for the purposes of the present invention, that the number of moles of the sum of all magnesium-containing compounds on the carrier, in the product of the second step of the synthesis of the catalyst of this invention, be in excess of the number of moles of OH groups originally present on the carrier, prior to the contact of the carrier with the liquid containing the organomagnesium composition. The molar ratio of the sum of all magnesium-containing compounds in the product of the second step to the aforementioned OH groups is greater than 1, preferably it is from about 1.1 to about 3.5 and most preferably from about 2.0 to about 3.5.

To assure that most, if not all, of the magnesium-containing compound(s) are retained on the carrier, the liquid is removed from the reaction vessel with care to assure that none or very little magnesium-containing compound(s) are removed with it. The liquid may be removed by any means assuring that substantially all of the magnesium-containing compound(s) remain on the carrier, e.g., by distillation of the mixture of the impregnated carrier and the solvents, evaporation, decantation or centrifugation. Evaporation at about the boiling point of the liquid is the most preferred method of liquid removal. It is also important that the product of the second reaction step is not washed so that the excess of the magnesium-containing compound or compounds which did not react with the hydroxyl (OH) groups of the carrier is retained on the carrier. After the liquid is removed, the resulting product is dried by any conventional means, e.g., drying at ambient temperature or at 50°–80° C. for about 12–16 hours with a stream of dry nitrogen to produce a free-flowing powder.

Whether magnesium-containing compound(s) is in the form of a reaction product with the carrier or in the form of a non-reacted precipitate, it is noted that the magnesium-containing compound(s) may, optionally, be in the form of a complex with one or more electron donating agents (i.e., Lewis bases). For example, when ethylmagnesium chloride is precipitated from a hexane/tetrahydrofuran solution, each mole of the ethylmagnesium chloride precipitated may be complexed with approximately one mole of tetrahydrofuran. In more general terms, when an organomagnesium composition is precipitated from a solution containing an ether, the resulting precipitate may have molecules of this ether complexed with molecules of the organomagnesium composition.

The amount of magnesium-containing compound(s) which is incorporated onto the carrier should be sufficient to react with tetravalent vanadium and, optionally, with tetravalent titanium, in order to incorporate a catalytically effective amount of vanadium (and, optionally, titanium) on the carrier in the manner set forth hereinbelow. Thus, the carrier should comprise from about 0.1 to about 50, preferably about 0.1 to about 5 milimoles (mmoles) of magnesium per gram of carrier (after the treatment of the carrier with the organomagnesium composition is completed). When a liquid containing an organomagnesium composition is contacted with a carrier, the amount of magnesium in this liquid in terms of mmoles may be essentially the same as that stated above which is incorporated onto the carrier.

When a non-Lewis base co-solvent is used to slurry the carrier, an amount of such co-solvent sufficient to slurry such a carrier is used, e.g., from about 2 to about 100 mililiters (mls), preferably from about 5 to about 15 mls, of such co-solvent may be present per gram of carrier.

While the above-exemplified methods of incorporating a solid reactive organomagnesium composition onto a carrier are preferred, it will be understood that alternative methods are available. For instance, it is possible to precipitate a dialkylmagnesium composition onto a carrier from a hydrocarbyl or halohydrocarbyl solvent containing essentially no ether. It is also possible to combine a carrier and a solid organomagnesium composition in the absence of a solvent by means of a ball milling device. However, such a ball milling process is less preferred, particularly because it does not tend to effectively incorporate a reactive magnesium compound into the pores of the carrier.

Mechanical shearing means, such as ball milling, are not necessary to achieve the desired manner of incorporation of the catalyst onto carrier in accordance with the present invention. Accordingly, a ball milling process, such as that described in Examples 2-5 of Grant, U.S. Pat. No. 3,821,186, is unnecessary and should be avoided. Moreover, a ball milling process may tend to disrupt the particle size and morphology of the carrier. Since catalysts made in accordance with the present invention are capable of being used in gas phase, fluid bed polymerization processes, e.g., as described by Karol et al, U.S. Pat. No. 4,302,566, the particle size and morphology of the catalyst may be critical. Accordingly, another reason for avoiding ball milling is to preserve the particle size and morphology of the carrier while it is being treated in accordance with the process of the present invention.

The free-flowing powder obtained in the second step is reacted with at least one tetravalent vanadium compound dissolved in a liquid medium diluent. The vanadium compound is soluble in this liquid reaction medium, while the treated carrier (i.e., the free-flowing powder), including the magnesium-containing compound(s), is insoluble in this liquid reaction medium. Thus, the reaction which takes place between the tetravalent vanadium and the reactive magnesium-containing compound(s) is a reaction of a solid with a liquid. It is further noted that the reacted vanadium is insoluble in the liquid reaction medium.

Without wishing to be bound by any theory of operability, it is thought that the reaction which takes place between the magnesium compound which is not a reaction product of an organomagnesium composition with a carrier and the tetravalent vanadium in the liquid reaction medium is essentially an oxidation/reduction reaction, wherein the magnesium compound acts as a reducing agent for the tetravalent vanadium. On the other hand, while not wishing to be bound by any particular theory or chemical mechanism, the reaction which takes place between (1) tetravalent vanadium and (2) the reaction product an organomagnesium composition and carrier containing reactive OH groups is not an oxidation/reduction reaction. However, it is noted that both of the above-mentioned reactions lead to the incorporation of vanadium onto the carrier.

As mentioned above, in an alternative embodiment, the free-flowing powder is contacted with a mixture of at least one tetravalent vanadium compound and at least one tetravalent titanium compound dissolved in the same liquid medium. In this alternative embodiment, both, the vanadium and the titanium compounds are incorporated onto the carrier.

The tetravalent vanadium compound or compounds which are used in the liquid reaction medium are any organo-vanadium or halogen-containing vanadium compounds which are soluble in the liquid medium used in the third catalyst synthesis step and in which the vanadium is in oxidation state of $+3$, $+4$, or $+5$, such as vanadium halides, e.g., vanadium tetrachloride, $VCl_4$, vanadium tetrabromide, $VBr_4$, vanadium alkoxides wherein the alkoxide moiety has a branched or unbranched alkyl radical of 1 to about 20 carbon atoms and preferably 1 to about 6 carbon atoms. The most preferred vanadium compound is vanadium tetrachloride.

Mixtures of such compounds may also be used and generally no restrictions are imposed on the components which may be included. Any vanadium compound that may be used alone may also be used in conjunction with other vanadium compounds.

The tetravalent titanium compound or compounds used in the alternative embodiment are any titanium compounds soluble in the liquid medium used in the third catalyst synthesis step, such as, titanium halides, e.g., titanium tetrachloride, $TiCl_4$, titanium tetrabromide, $TiBr_4$, titanium alkoxides, wherein the alkoxide moiety has a branched or unbranched alkyl radical of about 1 to about 20 carbon atoms, preferably 1 to about 6 carbon atoms. The most preferred titanium compound is titanium tetrachloride.

Mixtures of such titanium compounds may also be used in conjunction with one or more of the vanadium compounds discussed above and generally no restrictions are imposed on the titanium compounds which may be included. Any titanium compound that may be used alone may also be used in conjunction with other titanium compounds.

Suitable liquid medium diluents are materials in which the tetravalent vanadium and, optionally, tetravalent titanium compounds, are at least partially soluble and which are liquid at reaction temperatures. Preferred diluents are alkanes, such as hexane, n-heptane, octane, nonane, and decane, although a variety of other materials including cycloalkanes, such as cyclohexane, aromatics, such as benzene and ethylbenzene, and halogenated and hydrogenated aromatics, such as chlorobenzene, ortho-dichlorobenzene, can be employed. The most preferred diluent is n-heptane. Prior to use, the diluent should be purified, such as by percolation through silica gel and/or molecular sieves, to remove traces of water, oxygen, polar compounds, and other materials capable of adversely affecting catalyst activity. The magnesium-containing dry, free-flowing powder is reacted with one or more tetravalent vanadium and, optionally, with one or more tetravalent titanium, compound(s) at a temperature and for a time sufficient to yield a solid catalyst component. Temperatures at which this reaction is conducted range from about −40° to about 250° C., preferably, from about 0° to about 170° C., and most preferably, the reaction is conducted at a temperature of 25°–100° C. Suitable reaction times range from about ½ to about 25 hours, with about ½ to about 6 hours being preferred.

The reaction of the tetravalent vanadium in the liquid medium with the magnesium-containing carrier material conveniently takes place by slurrying the solid carrier in a solution of the tetravalent vanadium compound in the diluent and heating the liquid reaction medium to a suitable reaction temperature, e.g., to the reflux temperature of the diluent at standard atmospheric pressure. Thus, the reaction may take place under reflux conditions.

In an alternative embodiment, at least one tetravalent titanium compound is added to the liquid diluent to form a solution comprising both, the vanadium and the titanium compounds. All of the reaction conditions and the manner of conducting the reaction when the titanium compound is used with the vanadium compound are the same as those used when the vanadium compound alone is used.

In yet another alternative embodiment, the vanadium-containing catalyst is prepared in the manner described above and a tetravalent titanium-containing catalyst is prepared separately in the manner identical to that in which the vanadium-containing catalyst is prepared. The two catalysts are then combined in suitable proportions, i.e., to obtain a catalyst composition wherein the molar ratio of vanadium to titanium is 0.01 to 99.0, preferably 0.1 to 10.0 and most preferably is 0.2 to 5.0.

The various reaction parameters can be widely varied, suitable selection of such parameters being well within the skill of those having ordinary skill in the art. The volume of the tetravalent vanadium compound solution added to the magnesium-containing powder initially slurried in the solution may be from about 0.1 to about 10 milimiters (mls) per gram of such carrier. The concentration of the vanadium compound solution may be, for example, from about 0.1 to about 5 Molar. It is important, however, that the molar amount of the tetravalent vanadium compound in the solution is in excess of the molar amount of the organomagnesium composition used to treat the carrier in the first step of the catalyst synthesis. Thus, the molar ratio of the tetravalent vanadium to the organomagnesium composition is from about 1 to about 10, preferably from about 3 to about 6. Unreacted vanadium may be removed by any suitable separation techniques, such as decantation, filtration and/or washing.

When the tetravalent titanium compound is used in conjunction with the vanadium compound, the aforementioned volumetric proportions and molar concentrations also apply to the solution containing both, the vanadium and the titanium compounds, with the understanding that the amount of each compound is proportioned in such a manner that sum total of the amounts of the two compounds is such that the molar concentration of the sum is as stated above, i.e., about 0.1 to about 5 Molar. The relative proportions of vanadium to titanium in the solution containing both compounds are such that the final catalyst composition has the molar ratio of vanadium to titanium of 0.01 to 99.0, preferably 0.1 to 10.0 and most preferably 0.2 to 5.0. Similarly, the molar amounts of the sum total of the amounts of the two compounds, i.e., vanadium and titanium, must be in excess of the moles of the organomagnesium composition used to treat the carrier in the first step of the catalyst synthesis. Thus the molar ratio of the sum of the tetravalent vanadium compound and tetravalent titanium compound to the moles of the organomagnesium composition on the carrier is from about 1 to about 10, preferably from about 3 to about 6. Unreacted titanium may be removed, similarly to vanadium, by any suitable separation techniques, such as decantation, filtration and/or washing.

After the reaction is completed, the slurry, formed by the reaction mixture, is filtered, washed with a suitable washing agent, e.g., an alkane, such as hexane, and dried in an inert atmosphere, e.g., nitrogen.

As indicated above, the catalysts of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable raction by-products resulting from preparation of the neat, liquid reaction product. Purification of any diluent employed in the second and third preparative steps in the manner described above also is helpful in this regard.

It may also be possible to replace some or all of the above-mentioned tetravalent vanadium and titanium compounds with one or more other transition metal compounds. Such other transition metal compounds are exemplified in Graff et al, U.S. Pat. No. 4,173,547, column 6, lines 55–60. Preferred transition metal compounds include zirconium compounds (e.g., $ZrCl_4$).

The thus-formed supported catalyst may be activated with suitable activators also known as co-cocatalysts or catalyst promoters. The activators are known in the art and they include any of the materials commonly employed as promoters for olefin polymerization catalyst components containing compounds of the Group IB, IIA, IIB, IIIB and IVB of the Periodic Chart of the Elements, published by Fisher Scientific Company, Catalog Number 5-702-10. Examples of such promoters are metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures also can be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferred for use according to this invention are the Group IIIB metal alkyls and dialkylhalides having 1 to about 20 carbon atoms per alkyl radical. More preferably, the promoter is a trialkylaluminum compound having 1 to about 6 carbon atoms per alkyl radical.

The organometallic promoter is employed in an amount which is at least effective to promote the polymerization activity of the solid component of the catalysts of this invention. Preferably, at least about three parts by weight, of promoter are employed per part, by weight, of solid catalyst component, although higher ratios, such as 10:1, 25:1, 100:1 or higher also are suitable and often given highly beneficial results. In slurry polymerization processes, a portion of the promoter can be employed to pretreat the polymerization medium if desired. Other promoters which can be used herein are disclosed in Stevens et al, U.S. Pat. No. 3,787,384, column 4, line 45 to column 5, line 12, and in Strobel et al, U.S. Pat. No. 4,148,754, column 4, line 56 to column 5, line 59, the entire contents of both patents being incorporated herein by reference. The most preferred activator is triisobutylaluminum.

The catalyst may be activated in situ by adding the activator and catalyst separated to the polymerization medium. It is also possible to combine the catalyst and activator before introduction thereof into the polymerization medium, e.g., for up to about 2 hours prior to the introduction thereof into the polymerization medium at a temperature of from about −40° to about 100° C.

A suitable activating amount of the activator may be used to promote the polymerization activity of the catalyst. The aforementioned proportions of the activator can also be expressed in terms of the number of moles of activator per gram atom of vanadium in the catalyst of, e.g., from about 1 to about 100 and is preferably greater than about 5. If titanium is used with vanadium, the above proportions are maintained with respect to the sum total of gram atoms of vanadium and titanium.

Catalysts of the present invention exhibit high levels of productivity and excellent stability, as discussed in detail below. The level of stability of the catalyst is surprising in view of the relatively low level of stability of vanadium-based catalysts of the prior art. Such prior art vanadium-based catalysts required chlorinated hydrocarbon modifiers to maintain a reasonable level of stability thereof. While the modifiers improved activity of the catalyst as a function of time, i.e., stability of the catalyst, they poisoned catalytic activity of titanium containing compounds. Accordingly, the catalysts containing both vanadium and titanium were not feasible.

However, since vanadium catalysts of the present invention retain their activity without the use of modifiers, mixed vanadium and titanium catalysts can be prepared in accordance with the teachings of this invention. Such mixed catalysts (i.e., those containing vanadium and titanium) can be used in olefin polymerization reactions with a high degree of flexibility to produce a variety of products. For example, the molecular weight distribution of the (co)polymer can be regulated by varying the proportions of vanadium and titanium. In the mixed catalysts, the relative amounts of vanadium and titanium are such that the molar ratio of vanadium to titanium in the soluton used in step (iii) of the synthesis to treat the powder of step (ii) is 0.01 to 99, preferably 0.1 to 10 and most preferably 0.2 to 5.0.

Alpha-olefins may be polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive melt index of the polymer produced.

The molecular weight distribution of the polymers prepared in the presence of the catalysts of the present invention, as measured by the melt flow ratio (MFR) values, varies from about 60 to about 150 for HDPE products having a density of about 0.945 to about 0.970, and a $I_2$ melt index of about 50 to about 0.1, and from about 90 to about 240 for LLDPE products having a density of about 0.920 to about 0.940, and an $I_2$ melt index of about 50 to about 0.1. As is known to those skilled in the art, higher MFR values are indicative of a relatively broad molecular weight distribution of the polymer.

The catalysts prepared according to the present invention are highly active and may have an activity of at least about 500–5,000 grams of polymer per gram of catalyst per 100 psi of ethylene in about 3 hours.

Advantageous properties of linear low density polyethylene polymers are described by Anderson et al, U.S. Pat. No. 4,076,698. The linear low density polyethylene polymers prepared in accordance with the present invention may be polymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers.

When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating same is described by Levine et al, U.S. Pat. No. 4,011,382 and Karol et al, U.S. Pat. No. 4,302,566, the entire contents of both of which are incorporated herein by reference.

A preferred process for conducting a gas phase, fluid bed polymerization is described below.

The polymerization reaction is conducted by contacting a stream of the monomers, in a gas phase process, such as in the fluid bed process described below, and substantially in the absence of catalyst poisons, such as moisture, oxygen, CO, $CO_2$, and acetylene with a catalytically effective amount of the completely activated catalyst at a temperature and at a pressure sufficient to initiate the polymerization reaction.

In order to achieve the desired density ranges in the copolymers it is necessary to copolymerize a sufficient amount of the comonomers having three or more carbon atoms with ethylene to achieve a level of >0 to 10 mol percent of the $C_3$ to $C_8$ comonomer in the copolymer. The amount of comonomer needed to achieve this result depends on the particular comonomer(s) employed.

Thus, 1-hexene can be incorporated into an ethylene polymer chain in a gas phase reactor in amounts up to 20 percent by weight, preferably about 5 to about 11 percent by weight. The reaction is preferably conducted in a fluid bed reactor using the catalyst of the invention.

A fluidized bed reaction system which can be used in the practice of the process of the present invention is illustrated in FIG. 1. With reference thereto, a reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. The term $G_{mf}$ is used herein in the accepted form as the abbreviation for the minimum mass gas flow required to achieve fluidization, see C. Y. Wen and Y. H. Yu, "Mechanics of Fluidization", *Chemical Engineering Progress Symposium Series*, Vol. 62, p. 100–111 (1966).

It is essential that the bed always contains polymer particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When they are different, they are withdrawn with the desired formed polymer particles as the first product. Eventually, a fluidized bed of the desired polymer particles supplants the start-up bed.

The partially or completely activated catalyst used in the fluidized bed is preferably stored for service in a reservoir 32 under a blanket of a gas which is inert to the stored material, such as nitrogen or argon.

Fluidization is achieved by a high rate of gas recycle to and through the bed, typically on the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. A gas distribution plate 20 is positioned above the point of return to aid fluidization of the bed.

The portion of the gas stream which does not react in the bed constitutes the recycle gas which is removed from the polymerization zone, preferably by passing it into a velocity reduction zone 14 above the bed where entrained particles are given an opportunity to return to the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then compressed in a compressor 25 and then passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed, thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type, or any similar plate known in the art. The elements of the plate may all be stationary, or the plate may be of the mobile type disclosed in U.S. Pat. No. 3,298,792, the entire contents of which are incorporated herein by reference. Whatever the design of the plate, it must diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed varies between about 0 to about 2.0 moles of hydrogen per mole of the ethylene monomer in the gas stream.

Any gas inert to the catalyst and reactants can also be present in the gas stream. The activator compound is preferably added to the reaction system at the hottest portion of the gas which is usually downstream from heat exchanger 26. Thus, the activator may be fed into the gas recycle system from dispenser 27 thru line 27A.

Zinc (Zn) compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention as molecular weight control or chain transfer agents, that is, to increase the melt flow index values of the copolymers that are produced. About 0 to 50, and preferably about 20 to 30, moles of the Zn compound (as Zn) may optionally be used in the gas stream in the reactor per mole of titanium and/or vanadium compound in the reactor. The zinc compounds are introduced into the reactor preferably in the form of a dilute solution (2 to 30 weight percent) in hydrocarbon solvent or absorbed on a solid diluent material, such as silica, of the types described above, in amounts of about 10 to about 50 weight percent. These compositions tend to be pyrophoric. The zinc compound may be added alone, or with any additional portions of the activator compound that are to be added to the reactor from a feeder, not shown, which could be positioned adjacent dispenser 27, near the hottest portion of the gas recycle system.

It is essential to operate the fluid bed reactor at a temperature below the sintering temperature of the polymer particles. To insure that sintering will not occur, operating temperatures below the sintering temperature are desired. For the production of ethylene copolymers in the process of the present invention an operating temperature of about 30° to 115° C. is preferred, and a temperature of about 75° to 95° C. is most preferred. Temperatures of about 75° to 90° C. are used to prepare polymer products having a density of about 0.90 to 0.94 gms/cc, temperatures of about 80° to 100° C. are used to prepare products having a density of about 0.94 to 0.95 gms/cc, and temperatures of about 90° to 115° C. are used to prepare products having a density of about 0.95 to 0.97 gms/cc.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption at a point 30 which is above the distribution plate 20. Injecting the catalyst at a point above the distribution plate is an important feature of this invention. Since the catalysts used in the practice of this invention are highly active, injection of the fully activated catalyst into the area below the distribution plate may cause polymerization to begin in that area and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst, such as nitrogen or argon, is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in the rate of heat generation. This insures the maintenance of an essentially constant temperature in the bed. It will be apparent to those skilled in the art that complete instrumentation of both the fluidized bed and the recycle gas cooling system is necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particulates settle to preclude further polymerization and sintering when the particles reach their ultimate collection zone. The suspending gas may also be used, to drive the product of one reactor to another reactor.

The particulate polymer product is conveniently and preferably withdrawn through the sequential operation of a pair of timed values 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system of this invention yields a fluid bed product having an average particle size between about 0.005 to about 0.07 inches and preferably about 0.02 to about 0.04 inches.

The feed stream of gaseous monomer, with or without inert gaseous diluents, is fed into the reactor at a space time rate of about 2 to 10 pounds/hour/cubic foot of bed volume.

The term virgin resin or polymer as used herein means polymer, in granular form, as it is recovered from the polymerization reactor.

Catalysts of the present invention produce polymers having low die swell characteristics, as suggested by the values of 100–120 for $M_{6000}$ test. (The $M_{6000}$ test comprises forcing molten polymer through an orifice at a shear rate of 6000 sec$^{-1}$. The value of $M_{6000}$ is equal to $(d_1/d_2)$ (100), where $d_1$=diameter of orifice and $d_2$=diameter of polymer after the orifice.) Such polymers are useful in the fabrication of products for the household and industrial containers (HIC) markets, such as detergent bottles, soap containers or any other containers that are used for storing organic liquids.

The following Examples further illustrate the essential features of the invention. However, it will be apparent to those skilled in the art that the specific reactants and reaction conditions used in the Examples do not limit the scope of the invention.

EXAMPLE 1

All procedures were carried out in glass or quartz equipment under purified nitrogen using predried nitrogen-purged solvents.

Catalyst Preparation

First Step 65.1 grams of Davison silica gel, Grade 952 (a trademark of and available from the Davison Chemical Division of W. R. Grace and Company, Baltimore, MD), heated at 800° C. in the atmosphere of dry nitrogen for twelve hours was placed into a one-liter round bottom flask containing 375 ml of dry hexane. The silica/hexane slurry was brought to reflux and 25.0 ml of ethylmagnesium chloride (1.94 molar in tetrahydrofuran, THF) was added dropwise to the refluxing solution. The reflux was continued for one hour, then the solvents were removed by distillation to give 73.3 grams of a free-flowing powder. The free-flowing powder contained 0.70 mmols/gr of magnesium (Mg), which compared favorably with the theoretical calculated amount of 0.66 mmols/gr. of Mg.

Second Step

Vanadium tetrachloride, $VCl_4$ (4.08 grs, 21.1 mmols) was added to 150 mls of dry heptane and the solution transferred to a 500 ml round bottom flask. 10.05 grs of the product of the first step, obtained above, was added to the $VCl_4$/heptane solution at room temperature. The 10.05 grs of the product of the first step contained 6.95 mmols of Mg. The silica turned a dark brown color. The resulting slurry was refluxed for one hour, cooled to room temperature, filtered, washed with 500 mls (ten 50 ml aliquots) of dry hexane, and dried overnight at room temperature with a nitrogen stream. Yield: 10.98 grams of product which analyzed as follows: Mg (Theory)—0.60 mmols/gr (V/Mg mole ratio in reaction vessel was 3.2).

All experimental procedures were performed under inert conditions. Vanadium tetrachloride was used as received from ALFA Products, Thiokol/Ventron Division, 152 Andover Street, Danvers, Mass. 01923. Hexane and heptane were dried over sodium and freshly distilled prior to use.

The hydroxyl content of Davison Grade 952 silica was not measured but was estimated to have been between about 0.40-0.60 mmols/gr, based on the analysis of similar silicas.

EXAMPLES 2-6

Additional catalysts were prepared in accordance with the procedure of Example 1, except that the $VCl_4$/Mg mole ratio was varied in the second step from 3.0 to 7.0. The amount of hydroxyl groups contained in the silica, the $VCl_4$/Mg mole ratio in the second step and the calculated amount of Mg in the final catalyst product (expressed in terms of milimoles per gram of product) for respective examples are summarized in Table I, below.

TABLE I

| Catalyst of Example | OH in Silica 952 (mmols/gm) | Second Step $VCl_4$/Mg | Calculated Magnesium Content (mmols/gm) |
|---|---|---|---|
| 1 | ND* | 3.0 | 0.60 |
| 2 | ND* | 3.4 | 1.00 |
| 3 | 0.40 | 4.8 | 0.53 |
| 4 | 0.40 | 7.0 | 0.64 |
| 5 | ND* | 3.1 | 0.58 |

*ND — Not determined

COMPARATIVE EXAMPLE A

Several catalysts, prepared substantially in accordance with the teachings of Karol et al, U.S. Pat. No. 4,302,566, were used in comparative testing as discussed in Examples given hereinafter. These catalysts are referred to herein as "comparative A" catalysts or simply as "A" catalysts.

These catalysts are substantially equivalent to those prepared by the following representative procedure.

In a 5 liter flask equipped with a mechanical stirrer, 16.0 g (0.168 Mol) of anhydrous $MgCl_2$ is mixed with 850 ml of pure tetrahydrofuran under nitrogen. The mixture is stirred at room temperature (about 25° C.) while 13.05 g (0.069 Mol) of $TiCl_4$ is added dropwise. After complete addition, the contents of the flask are heated to reflux for about one-half to one hour to dissolve the solids. The system is cooled to room temperature and 3 liters of pure n-hexane are slowly added over a period of one-half hour. A yellow solid precipitates. The supernatant fluid is decanted and the solids are washed three times, with one liter of n-hexane each time. The solids are filtered and dried in a rotating evaporating flask at 40°-60° C. to give 55 g of solid precursor composition.

The precursor composition may be analyzed at this point for Mg and Ti content since some of the Mg and/or Ti compound may have been lost during the isolation of the precursor composition. The empirical formulas used herein in reporting these precursor compositions are derived by assuming that the Mg and the Ti still exist in the form of the compounds in which they are first added to the electron donor compound and that all other residual weight in the precursor composition is due to the electron donor compound.

Analysis of the solid would typically show the following percent by weight: Mg-6.1 percent, Ti-4.9 percent; which corresponds to $TiMg_{2.45}Cl_{8.9}(THF)_{7.0}$. (THF means tetrahydrofuran.)

This precursor composition, which constitutes the catalytic portion of the comparative A catalyst, is supported on an inert silica carrier and activated in accordance with the teaching of the Karol et al patent.

COMPARATIVE EXAMPLE B

In this example, another comparative catalyst (referred to herein as catalyst B) was prepared in a manner similar to that of procedure of Example 1, except that titanium tetrachloride ($TiCl_4$) was used instead of the vanadium tetrachloride used in Example 1.

First Step 15 grams of Davison silica gel (dried at 200° C. for 4 hours) were placed into a 500 ml 4-neck reaction flask fitted with a dropping funnel, water condenser, dry nitrogen line, and overhead stirrer. Under a slow nitrogen purge, 200 ml of dry hexane was added to the silica while stirring. The silica/hexane slurry was brought to reflux temperature and 50 ml of 2.0M ethylmagnesium chloride in THF (EtMgCL/THF) solution was added dropwise (about 15 minutes) and the reflux was continued for an additional 30 minutes. After this time, the solvents were removed by distillation and the silica dried at 80° C. under a nitrogen purge. Total yield: 29 grams; theoretical Mg content: 3.45 mmols/gm.

Second Step 15 grams of the First Step reaction product (51.7 mmols of Mg) were placed into a 500 ml reaction flask (apparatus as described above). 200 ml of n-heptane containing 10.0 ml (91 mmols) of $TiCl_4$ was added to the flask while stirring. The slurry was refluxed for 45 minutes. After this time, the slurry was cooled to room temperature, transferred to a filter flask (under nitrogen), filtered, washed with four 100 ml portions of hexane and dried under nitrogen purge. The analyzed product contained 1.65 mmols/gr of Mg and 1.24 mmols/gr of Ti. This analysis compared favorably with the calculated (theoretical) amount of Mg of 1.67 mmols/gr.

COMPARATIVE EXAMPLE C

Another comparative catalyst (referred to herein as catalyst C), obtained commercially, is described in this example.

The comparative catalyst of this example is a commercially-available chromium oxide ($CrO_3$)-based catalyst substantially described in U.S. Pat. No. 4,011,382, the entire contents of which are incorporated by reference herein. Generally, the catalyst is formed by depositing a suitable chromium compound, titanium compound and fluorine compound on a dried support, and then activating the resulting composite composition by heating it in air or oxygen at a temperature of about 300° to 900° C., and preferably at about 700° to 850° C., for about 5 to 15 hours. The chromium compound, titanium compound and fluorine compound are usually deposited on the support from solutions thereof and in such quantities as to provide, after the activation step, the desired levels of Cr, Ti and F in the catalyst. After the compounds are placed on the support and it is activated, there results a powdery, free-flowing particulate material. About 0.005 to 1 weight percent of the composite catalyst is employed per pound of polymer produced.

The following representative procedure can be used, it is believed, to prepare a sample of catalyst C which is substantially equivalent to the catalyst C used herein for comparison with the catalyst of this application and with the comparative catalysts A and B.

To a solution of the desired amount of $CrO_3$ in three liters of distilled water there was added 500 grams of a porous silica support having a particle size of about 70 microns and a surface area of about 300 square meters per gram. The mixture of the support, water and $CrO_3$ was stirred and allowed to stand for about 15 minutes. It was then filtered to remove about 2200-2300 ml of solution. The $CrO_3$ loaded silica was then dried under a stream of nitrogen for about 4 hours at 200° C.

About 400 grams of the supported $CrO_3$ was then slurried in about 2000 ml of dry isopentane, and then a desired amount of tetraisopropyl titanium was added to the slurry. The system was then mixed thoroughly and then the isopentane was dried by heating the reaction vessel.

The dried material was then transferred to an activator (heating vessel) and a desired quantity of $(NH_4)_2SiF_6$ was added and admixed. The composition was then heated under $H_2$ at 50° C. for about 1 hour and then at 150° C. for about 1 hour to insure that all the isopentane was removed and to slowly remove organic residues from the tetraisopropyl titanate so as to avoid any danger of a fire. The $N_2$ stream was then replaced with a stream of dry air and the catalyst composition was activated at 300° C. for about 2 hours and then at 750° C. or 825° C. for about 8 hours. The activated catalyst was then cooled with dry air (at ambient temperatures) to about 150° C. and further cooled from 150° C. to room temperature with $N_2$ (at ambient temperature).

The amounts of chromium, titanium and fluorine compounds which were added to provide the desired levels of these elements in the activated catalyst are as follows:

| Weight % of compound added to support | Weight % of element in the activated catalyst |
|---|---|
| $CrO_3$ | Cr (as Cr) |
| 0.8 | 0.4 |
| 0.6 | 0.3 |
| 0.53 | 0.26 |
| 0.33 | 0.17 |
| 0.13 | 0.07 |
| Ti(isopropyl)$_4$ | Ti (as Ti) |
| 35 | 5.6 |
| 28 | 4.5 |
| 25 | 4.1 |
| $(NH_4)_2SiF_6$ | F (as F) |
| 1.5 | 0.7 |
| 0.6 | 0.3 |

The catalysts of Examples 1-6 were then used to polymerize ethylene and ethylene/hexene mixtures. The polymerization procedures are summarized below.

EXAMPLES 6-22

(Preparation of HDPE Products)

Catalysts were initially tested in a 1.6 liter autoclave slurry reactor and in a representative experiment, 1.0 liter of hexane was added to the autoclave while at ambient temperature.

In a number of examples, 1-butene and 1-hexene were used as comonomers. 1-butene and 1-hexene were introduced into the autoclave by transferring these monomers from a preweighed container using a slight positive pressure of nitrogen. The high density polyethylene resins were prepared as either ethylene homopolymers or copolymers with very low contents of comonomers.

Results are summarized in Table II.

TABLE II
SUMMARY OF HDPE PRODUCTS

| | | Polymerization Conditions | | | | Product | | | | |
|---|---|---|---|---|---|---|---|---|---|---|
| Example | Catalyst of Example | Catalyst (Grs) | Comonomer Type | $C_n/C_2$ | Polymerization Time (Minutes) | Polymer Yield (Grs) | $I_2{}^{(A)}$ | $I_{21}{}^{(B)}$ | MFR$^{(C)}$ | Polymer Density (Grs/cc) |
| 6  | 1 | 0.30 | 1-Butene | 0.11 | 80  | 164 | 0.25 | 29.6  | 120 | 0.948 |
| 7  | 1 | 0.30 | 1-Butene | 0.12 | 85  | 177 | 0.11 | 15.7  | 144 | 0.951 |
| 8  | 1 | 0.30 | 1-Butene | 0.08 | 120 | 121 | 0.33 | 46.6  | 140 | 0.958 |
| 9  | 1 | 0.30 | 1-Hexene | 0.15 | 115 | 159 | 0.19 | 28.1  | 144 | 0.957 |
| 10 | 1 | 0.30 | 1-Butene | 0.10 | 56  | 116 | 2.10 | 124.5 | 59  | ND* |
| 11 | 1 | 0.30 | 1-Butene | 0.10 | 74  | 125 | 0.74 | 45.8  | 62  | ND* |
| 12 | 1 | 0.31 | 1-Butene | 0.08 | 65  | 123 | 0.21 | 33    | 150 | ND* |
| 13 | 1 | 0.31 | 1-Butene | 0.09 | 81  | 88  | 5.2  | 360   | 69  | 0.963 |
| 14 | 2 | 0.30 | 1-Butene | 0.09 | 80  | 96  | 4.0  | 291   | 73  | 0.962 |
| 15 | 3 | 0.30 | None     | 0.00 | 80  | 96  | 1.3  | 168   | 129 | 0.965 |
| 16 | 3 | 0.31 | None     | 0.00 | 65  | 202 | 0.3  | 43.4  | 145 | 0.962 |
| 17 | 3 | 0.61 | 1-Hexene | 0.16 | 60  | 656 | 4.2  | 354   | 84  | ND* |
| 18 | 3 | 0.78 | None     | 0.00 | 92  | 421 | 1.8  | 183   | 102 | ND* |
| 19 | 4 | 0.30 | None     | 0.00 | 85  | 84  | 0.41 | 49.7  | 121 | 0.965 |
| 20 | 5 | 0.25 | 1-Hexene | 0.14 | 144 | 109 | 4.2  | 289   | 69  | ND* |
| 21 | 5 | 0.31 | 1-Butene | 0.07 | 79  | 93  | 4.6  | 310   | 67  | ND* |
| 22 | 5 | 0.31 | 1-Butene | 0.09 | 87  | 128 | 1.1  | 70    | 64  | ND* |

Other Conditions: 80° C., triisobutylaluminum cocatalyst, total pressure 140–160 psi.
$^{(A)}I_2$ is the Melt Index, 2 Kg wt.
$^{(B)}I_{21}$ is the High Load Melt Index, 21 Kg wt.
$^{(C)}$MFR is an abbreviation for Melt Flow Ratio, $I_{21}/I_2$.
*Not determined

EXAMPLES 23–27
(Preparation of LLDPE Products)

Linear low density polyethylene products were prepared in a 1.6 liter autoclave. In a typical experiment (Example 24), the autoclave was heated under a nitrogen purge to about 90° C. for one-half hour and then cooled to ambient temperature. About 900 mls of hexane and 100 grams of 1-hexene were added while stirring at about 900 rpm. (The total volume of hexane and hexene was about 1.0 liter in each experiment.) The catalyst was prepared by adding about 0.20 grams of the catalyst of Example 2 to a dry, nitrogen blanketed catalyst addition flask. About 50 ml of dry hexane and 1.0 ml of triisobutylaluminum (TIBA) in hexane (25 wt. % TIBA) were added to the catalyst addition flask to activate the catalyst. The contents of the catalyst addition flask were added with a slight nitrogen pressure to the autoclave. The autoclave was then filled with hydrogen to give a pressure of about 20 psi and then the autoclave was heated at about 3° C./minute to reach 80° C. Ethylene was introduced at 60° C. and the operating pressure maintained at 120 psi total pressure.

The ethylene was introduced through a Hastings Mass Flowmeter NALL-50KG/CC-420 interfaced with a strip chart recorder to monitor ethylene flow (gms/minute) as a function of time (minutes).

At the end of the polymerization time, about 80 minutes, the autoclave was cooled to room temperature, opened and the contents placed in a large container. About 300 ppm of Irganox 1076 was added as a hexane solution and volatiles allowed to evaporate under a hood. Polymer yield was about 142 grams.

Table III summarizes the polymerization conditions and properties of the products.

TABLE III
SUMMARY OF LLDPE PRODUCTS

| | | Polymerization Conditions | | | | Product | | | | |
|---|---|---|---|---|---|---|---|---|---|---|
| Example No. | Catalyst Of Example | Catalyst (grs) | Comonomer Type | $C_n/C_2$ | Polymerization Time (minutes) | Polymer Yield (grs) | $I_2$ | $I_{21}$ | MFR | Density (grs/cc) |
| 23 | 1  | 0.30 | 1-Hexene | 0.19 | 90 | 58   | 0.33 | 47.5 | 144 | 0.939 |
| 24 | 2  | 0.20 | 1-Hexene | 1.30 | 80 | 142  | 3.14 | 296  | 94  | 0.938 |
| 25 | 2* | 0.21 | 1-Hexene | 1.30 | 20 | ~5   | —    | —    | —   | — |
| 26 | 3  | 0.60 | 1-Hexene | 1.46 | 25 | 1166 | 2.38 | 236  | 99  | 0.925 |
| 27 | 4  | 0.30 | 1-Hexene | 1.97 | 54 | 165  | 0.14 | 33.7 | 239 | 0.922 |

*Triethylaluminum was used as a cocatalyst (TEAL).
Other Conditions: 80° C., triisobutylaluminum cocatalyst, total pressure ~140–160 psi.

Activity Profiles

Figure 2:
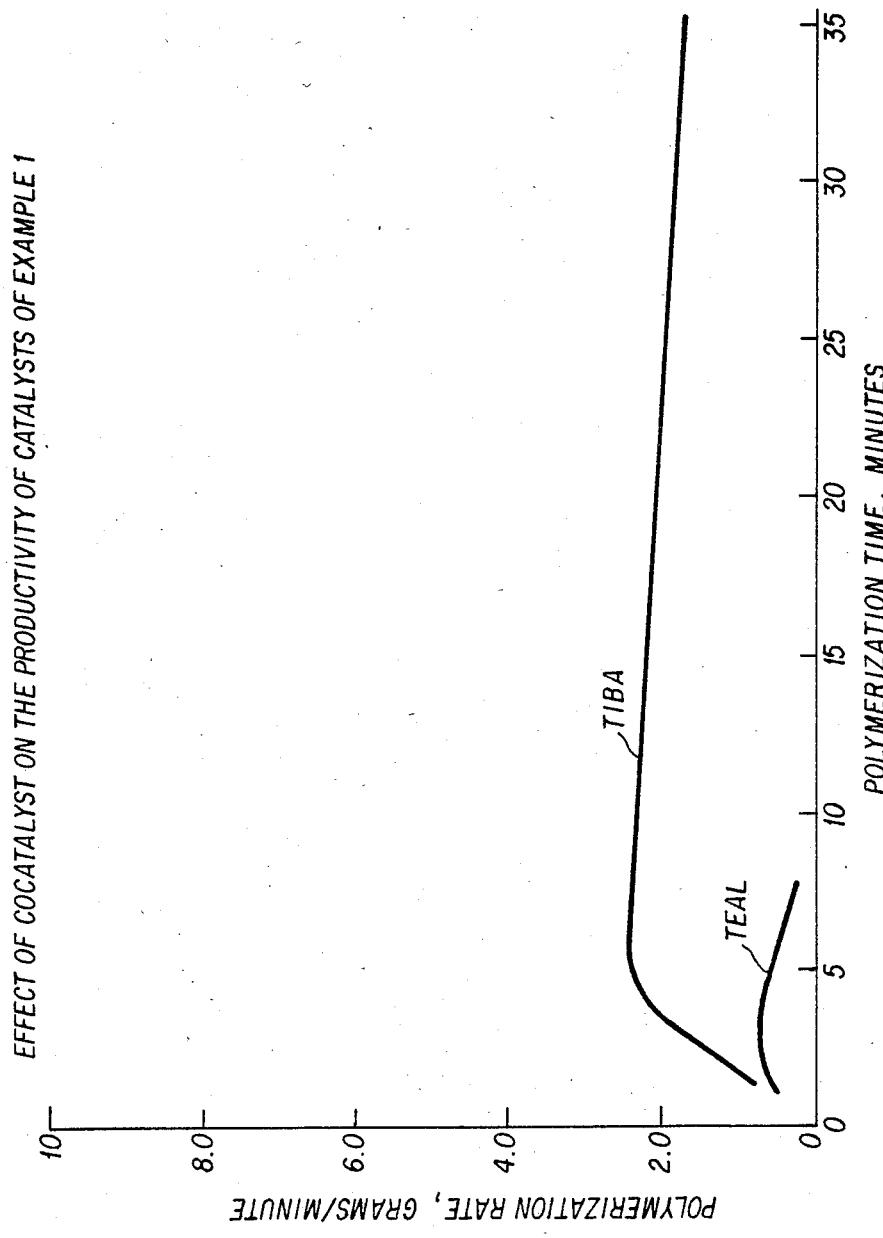
FIG. 2 is a graph illustrating stability of the catalysts of this invention with two different co-catalysts.

Vanadium-based Ziegler-Natta polymerization catalysts of prior art usually exhibit better productivity when triisobutylaluminum (TIBA), rather than triethylaluminum (TEAL), is used as the co-catalyst. This was the case for the catalysts prepared according to this invention and the effect is illustrated in FIG. 2 for the catalyst of Example 2. Examination of FIG. 2 shows that the TEAL-reduced catalyst achieved an activity of only about 0.5 grs of polymer/minute and exhibited very rapid activity decay, while the TIBA-reduced catalyst showed much better productivity and produced about 2.5 grs of polymer/minute with relatively slow decay.

Figure 3:
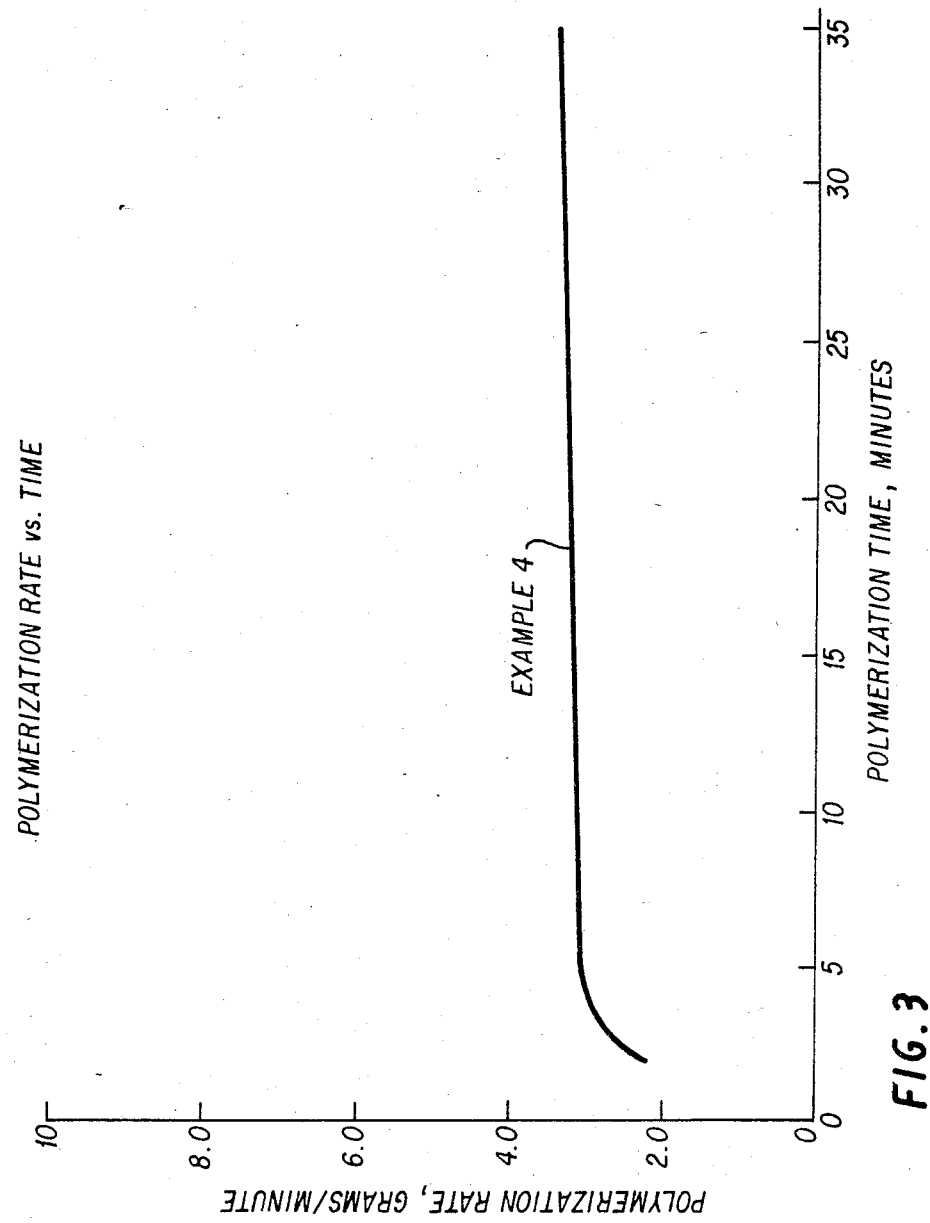
FIG. 3 is a graph illustrating activity of the catalyst of Example 4 as a function of time.

The stability of the catalyst of Example 4 is illustrated in FIG. 3. This excellent catalyst stability may be a characteristic unique to these particular vanadium-based catalysts. Generally, vanadium-based Ziegler-Natta catalysts of the prior art show relatively rapid activity decay which can be offset by the addition of chlorinated hydrocarbon modifiers to the reactor. As discussed above, these modifiers improve the catalyst productivity, but are incompatible with the titanium-based catalysts. However, since the vanadium-based catalysts of this invention do not require chlorinated hydrocarbon modifiers, they may be compatible with similar titanium-based catalysts giving rise to a high degree of flexibility in producing a variety of products with vanadium- and titanium-based catalyst mixtures.

Melt Flow Ratio ($I_{21}/I_2$) Effects

Figure 4:
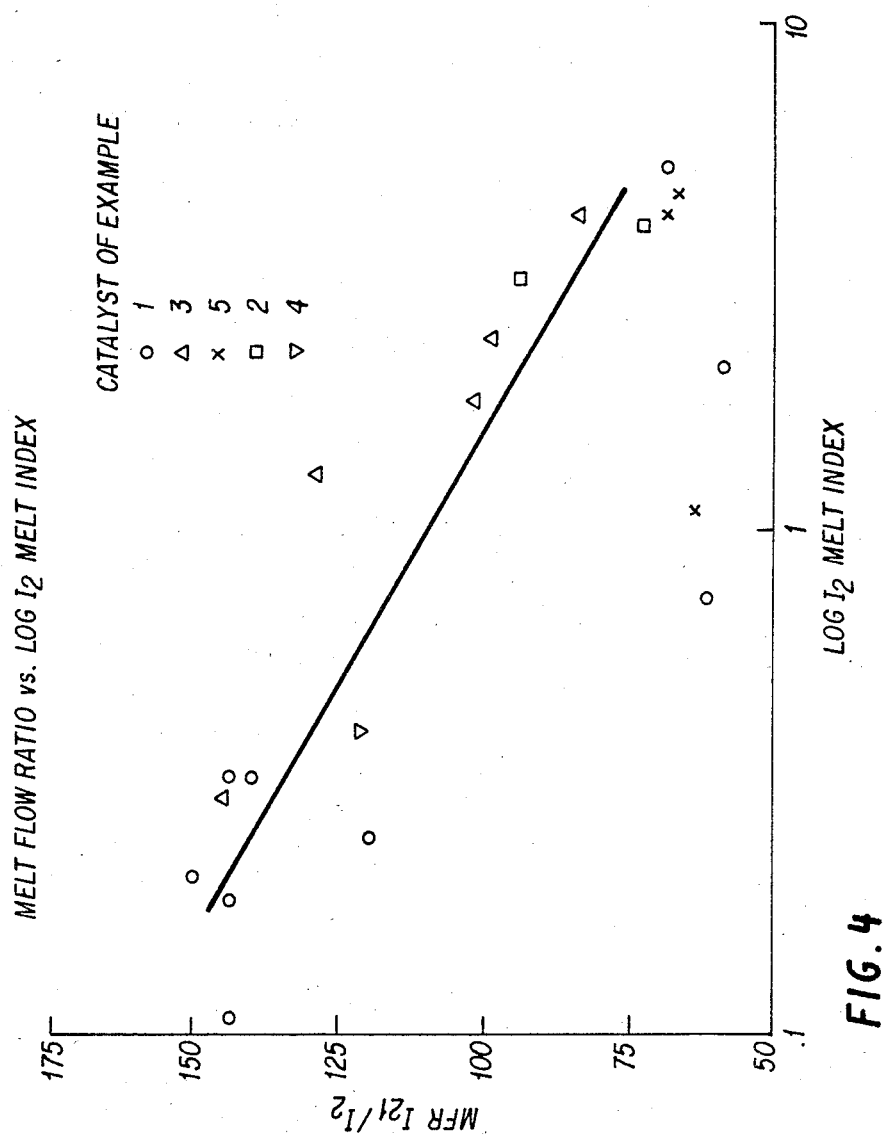
FIG. 4 is a graph illustrating the relationship of MFR values of catalysts of the present invention to $I_2$ values.

FIG. 4 shows the correlation between the melt flow ratio (MFR=$I_{21}/I_2$) and the log of the $I_2$ melt index, which is a measure of the molecular weight of a particular product. The melt flow ratios were about 140 and 75 for products with an $I_2$ melt index of about 0.3 and 4.0, respectively, indicating that the molecular weight distribution is much broader for products with a relatively high molecular weight (lower $I_2$ melt index).

Figure 5:
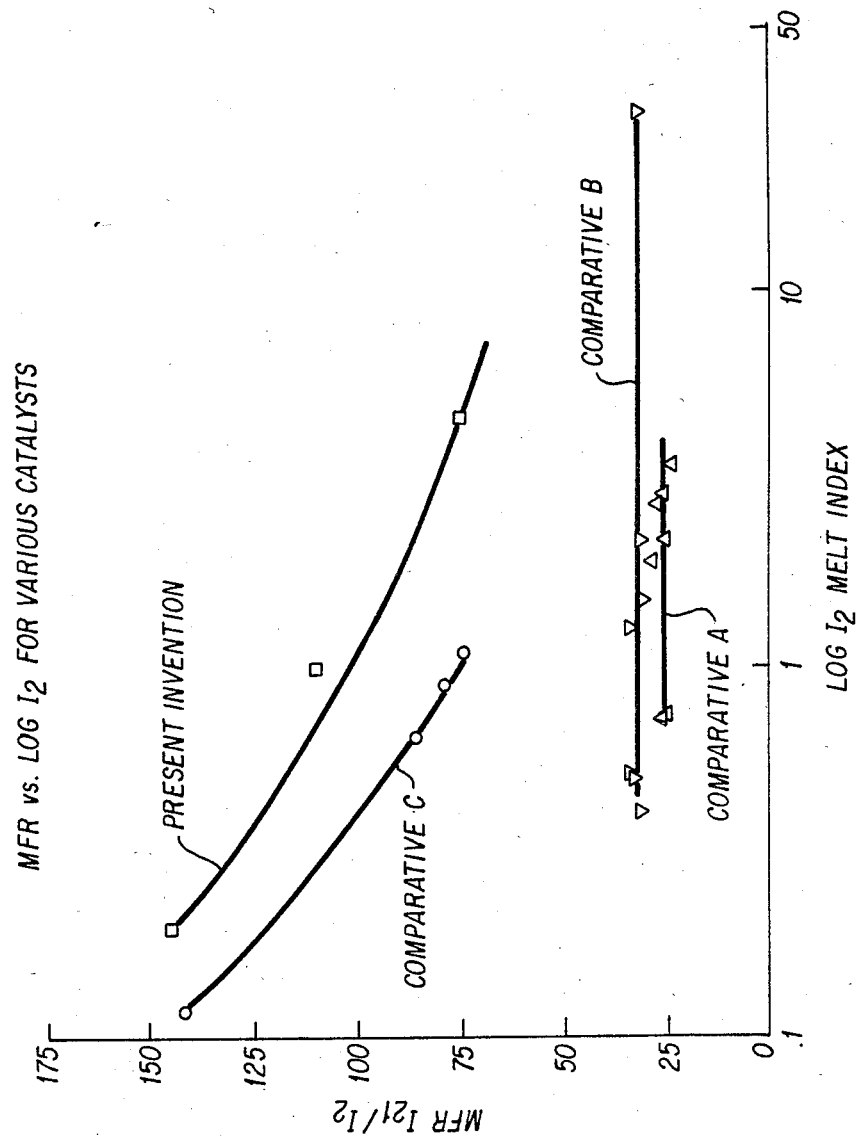
FIG. 5 is a graph comparing the relationship of MFR values to the $I_2$ melt index values for various catalysts.

This effect was not observed for the titanium tetrachloride-based comparative catalyst B or the comparative catalyst A. However, this effect is well documented for chromium-based comparative catalyst C, as illustrated in FIG. 5.

Relative Hexene Incorporation

Figure 6:
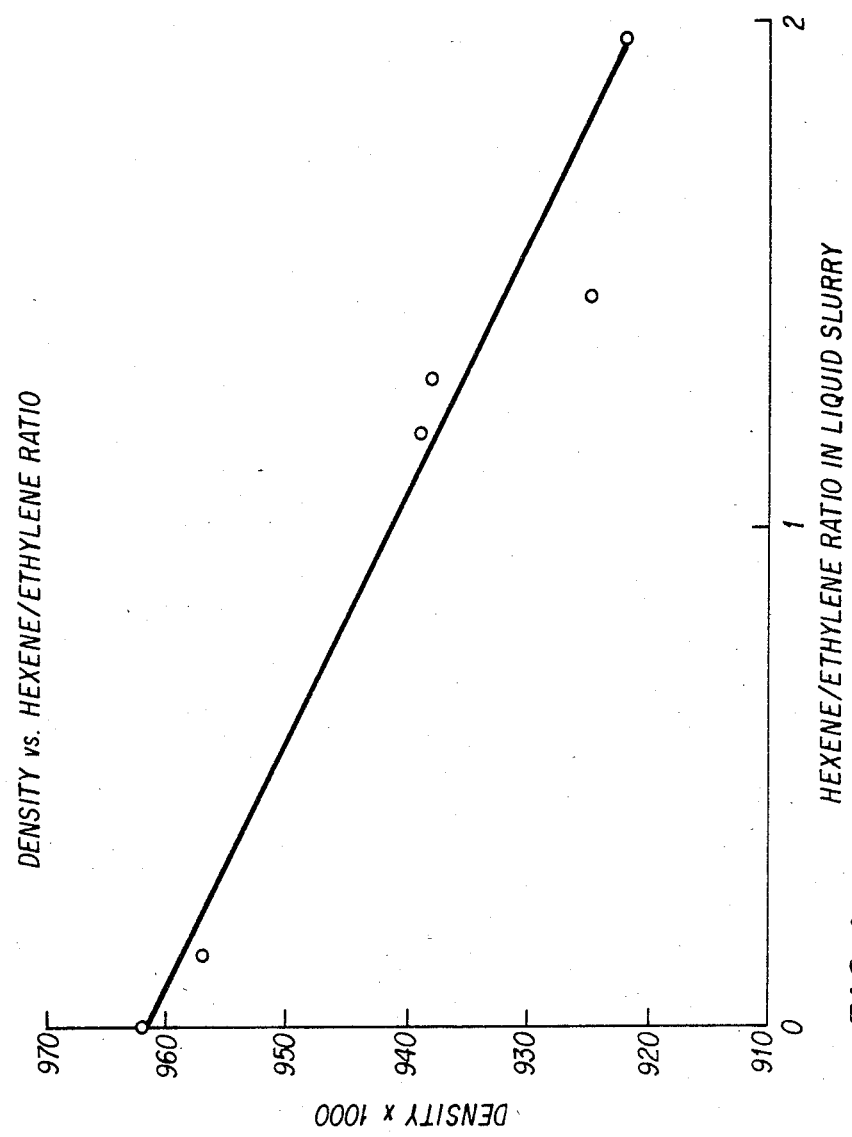
FIG. 6 is a graph illustrating the relationship of the density to hexene/ethylene ratio for polymers prepared with the catalysts of this inventnion.

FIG. 6 illustrates the correlation between product density, uncorrected for molecular weight effects, and hexene/ethylene ratio in the slurry phase of the laboratory reactor. The catalysts of the present invention possess sufficient copolymerization properties to produce ethylene/1-hexene copolymers with densities of about 0.920 grs/cc. For comparative purposes, the copolymerization properties of a high and low magnesium loaded comparative catalysts B are shown in FIG. 7. In FIG. 7, high-magnesium loaded (Mg content of about 0.90 mmols/gm) and low magnesium loaded (Mg content about 0.50 mmols/gm) comparatitve catalysts B were used for comparison. Examination of the data of FIG. 7 shows that the copolymerization properties of the catalysts of the present invention are intermediate between the catalysts A and the catalysts B.

EXAMPLES 28-29

(Catalysts Based on Mixtures of Vanadium and Titanium)

Two catalysts were prepared by using approximately a one to one molar ratio of vanadium tetrachloride and titanium tetrachloride in the second step of the catalyst preparation. All of the preparation steps were the same as those set forth above in Example 1. Two catalysts containing different magnesium levels were examined, 0.66 and 1.02 mmols of Mg/gr of final catalyst. The chemical composition of these catalysts is summarized in Table IV. The products prepared with each catalyst are summarized in Table V.

In order to produce an intermediate melt flow ratio product, it is necessary to use triisobutylaluminum (TIBA) as a co-catalyst. The data of Example 31, discussed below, shows that TEAL-activated titanium/vanadium mixed catalyst produces products having MFR values typical of the comparative B catalysts, showing that the vanadium active sites are not active. This was also illustrated in FIG. 2.

On the other hand, TIBA-reduced catalysts, in Examples 30, 32, 33, 34 and 35, also discussed below, produce polymers having MFR values intermediate between comparative catalysts B and the catalysts based only on vanadium, e.g., those of Example 1. Thus, the data shows that TIBA-activated catalysts possess both vanadium and titanium centers as active sites. Triethylaluminum (TEAL)-reduced catalysts produce products with melt flow ratios similar to those prepared with the comparative B catalysts, suggesting that TEAL inactivates the vanadium active sites leaving only titanium sites producing polymer. This data is consistent with the catalyst of the present invention that exhibited good productivity only when TIBA was used as the reducing agent (FIG. 2).

The data in Table V also suggests that the melt flow ratio may depend on the amount of magnesium used in the catalyst preparation. The catalyst of Example 28 (1.02 mmols Mg/gr) produced products with higher MFR's than the catalyst of Example 29 (0.66 mmols Mg/gr).

Die Swell of Vanadium Catalyst Products

Polymers produced with the catalysts of Examples 1 and 3 were tested for die swell measurements in order to determine if these high MFR products may be suitable in the HIC blow molding market. The data is summarized in Table VI.

The catalyst of Example 1 produced products well within the 100-120 range for $M_{6000}$ suggesting low die swell characteristics. The catalyst of Example 3 exhibited unacceptable die swell behavior, with products having $M_{6000}$ values greater than 120. The reason for this is unclear, however, the data does indicate that the catalysts of the present invention produce polymers suitable for the HIC market.

TABLE IV

| Catalysts Based on a Mixture of TiCl₄ and VCl₄ | | |
|---|---|---|
| Catalyst of Example | Calculated Mg Content mmols/gm | Vanadium* Titanium |
| 28 | 1.02 | 1.0 |
| 29 | 0.66 | 1.2 |

*The vanadium/titanium mole ratio used in the second reaction step.

TABLE V

SUMMARY OF THE PRODUCTS PREPARED WITH THE MIXED (VANADIUM/TITANIUM) CATALYSTS

| | | Polymerization Conditions | | | | Product | | | | |
|---|---|---|---|---|---|---|---|---|---|---|
| Example No. | Catalyst Of Example | Amount of Catalyst used (grs) | Co-catalyst Type | Comonomer Type | Polymerization Time-(Minutes) | Polymer Yield grs | $I_2$ | $I_{21}$ | MFR | Density (grs/cc) |
| 30 | 28 | 0.30 | TIBA | 1-Hexene | 28 | 230 | 0.28 | 17.4 | 63.0 | 0.927 |
| 31 | 28 | 0.21 | TEAL | 1-Hexene | 59 | 211 | 1.38 | 48.5 | 35.1 | 0.927 |
| 32 | 28 | 0.21 | TIBA | 1-Hexene | 47 | 162 | 0.85 | 41.9 | 49.4 | 0.929 |
| 33 | 28 | 0.20 | TIBA | 1-Hexene | 60 | 107 | 2.15 | 215 | 100 | 0.936 |
| 34 | 29 | 0.30 | TIBA | None | 50 | 144 | 0.30 | 12.9 | 43 | 0.958 |
| 35 | 29 | 0.31 | TIBA | 1-Hexene | 30 | — | 0.65 | 26.7 | 41 | 0.918 |

TABLE VI

Die Swell Measurements For The Catalysts

| Catalyst of Example | $I_2$ | $I_{21}$ | MFR | Density gms/cc | $M_{6000}$ |
|---|---|---|---|---|---|
| 1 | 0.25 | 29.6 | 120 | 0.948 | 106 |
| 1 | 0.11 | 15.7 | 144 | 0.951 | 99 |
| 1 | 0.33 | 46.6 | 140 | 0.958 | 111 |
| 1 | 0.20 | 28.1 | 144 | 0.957 | 102 |
| 3 | 1.3 | 168 | 129 | 0.965 | 133 |
| 3 | 0.3 | 43.4 | 145 | 0.962 | 140 |
| 3 | 0.41 | 49.7 | 121 | 0.965 | 131 |
| 3 | 1.8 | 183 | 102 | ND | 171 |
| 3 | 4.2 | 354 | 84 | ND | 137 |

ND — Not determined, however, these products were ethylene homopolymers (HDPE)

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

What is claimed is:

1. A process for preparing a supported catalyst composition for use in alpha-olefin polymerization reactions which comprises the steps of:
   (i) contacting a solid, porous carrier having reactive OH groups with a liquid, said liquid containing at least one organomagnesium composition having the empirical formula $$R_n MgR'_{(2-n)} \qquad (I)$$

where R and R' are the same or different and they are $C_1$–$C_{12}$ hydrocarbyl groups, provided that R' may also be halogen, and n is 0, 1 or 2, the number of moles of said organomagnesium composition being in excess of the number of moles of the OH groups on said carrier;
   (ii) removing said liquid from step (i) to obtain a magnesium-containing carrier in the form of a dry, free-flowing powder, said dry, free-flowing powder containing a stoichiometric molar excess of the magnesium-containing compounds with respect to the OH groups originally present on said carrier; and
   (iii) contacting said powder of step (ii) with a solution comprising a liquid medium and at least one tetravalent vanadium compound, said vanadium compound being soluble in said liquid medium, and said magnesium-containing carrier being substantially insoluble in said liquid medium,
whereby a compound of vanadium which is insoluble in said liquid medium becomes incorporated onto said carrier.

2. A process of claim 1 wherein the number of moles of said vanadium compound present in said solution of step (iii) is in excess of the stoichiometric amount thereof.

3. A process of claim 2 wherein the solid, porous carrier, prior to contact thereof with the liquid in step (i), is heated at a temperature of about 100° C. to about 1000° C.

4. A process of claim 3 wherein the solid, porous carrier is heated at a temperature of about 150° C. to about 850° C.

5. A process of claim 4 wherein the carrier is heated at a temperature of about 800° C.

6. A process of claim 5 wherein the heating is continued until the carrier contains about 0.5 to about 5 mmoles of the OH groups per gram of carrier.

7. A process of claim 6 wherein the heating is continued until the carrier contains about 0.3 to about 0.7 mmoles of the OH groups per gram of carrier.

8. A process of claim 7 wherein the carrier is silica having a surface hydroxyl group concentration of about 0.5 mmoles/gr, a surface area of 300 m²/gram and a pore volume of 1.65 m³/gram.

9. A process of claim 8 wherein R is a $C_1$–$C_4$ alkane group and R' is halogen.

10. A process of claim 9 wherein R' is bromine or chlorine.

11. A process of claim 10 wherein the organomagnesium composition is ethylmagnesium chloride.

12. A process of claim 11 wherein the liquid containing ethylmagnesium chloride is tetrahydrofuran.

13. A process of claim 12 wherein said liquid is removed in step (ii) by evaporation.

14. A process of claim 13 wherein the molar ratio of the oganomagnesium composition to the number of the moles of OH groups on the carrier is about 1.1 to about 3.5.

15. A process of claim 14 wherein the molar ratio of the tetravalent vanadium compound to the organomagnesium composition is from about 1 to about 10.

16. A process of claim 15 wherein the molar ratio of the tetravalent vanadium compound to the organomagnesium composition is from about 3 to about 6.

17. A process of claim 16 wherein the tetravalent vanadium compound is a vanadium halide.

18. A process of claim 17 wherein the tetravalent vanadium compound is vanadium tetrachloride or vanadium tetrabromide.

19. A process of claim 18 wherein the tetravalent vanadium compound is vanadium tetrachloride.

20. A process of claim 19 wherein the solution used in step (iii) to contact the powder of step (ii) further comprises a tetravalent titanium compound.

21. A process of claim 20 wherein the molar ratio of the sum of the tetravalent vanadium compound and the tetravalent titanium compound to the organomagnesium composition is from about 1 to about 10.

22. A process of claim 21 wherein the molar ratio of the sum of the tetravalent vanadium compound and the tetravalent titanium compound to the organomagnesium composition is from about 3 to about 6.

23. A process of claim 22 wherein the tetravalent titanium compound is a titanium halide.

24. A process of claim 23 wherein the tetravalent titanium compound is titanium tetrachloride or titanium tetrabromide.

25. A process of claim 24 wherein the tetravalent titanium compound is titanium tetrachloride.

26. A catalyst composition for use in alpha-olefin polymerization reactions prepared in a process comprising the steps of:
   (i) contacting a solid, porous carrier having reactive OH groups with a liquid, said liquid containing at least one organomagnesium composition having the empirical formula $$R_nMgR'_{(2-n)} \quad (I)$$

where R and R' are the same or different and they are $C_1$–$C_{12}$ hydrocarbyl groups, provided that R' may also be halogen, and n is 0, 1 or 2, the number of moles of said organomagnesium composition being in excess of the number of moles of the OH groups on said carrier;

(ii) removing said liquid from step (i) to obtain a magnesium-containing carrier in the form of a dry, free-flowing powder, said dry, free-flowing powder containing a stoichiometric molar excess of the magnesium-containing compounds with respect to the OH groups originally present on said carrier; and (iii) contacting said powder of step (ii) with a solution comprising a liquid medium and at least one tetravalent vanadium compound, said vanadium compound being soluble in said liquid medium, and said magnesium-containing carrier being substantially insoluble in said liquid medium, whereby a compound of vanadium which is insoluble in said liquid medium becomes incorporated onto said carrier.

27. A catalyst composition of claim 26 wherein the number of moles of said vanadium compound present in said solution of step (iii) is in excess of the stoichiometric amount thereof.

28. A catalyst composition of claim 27 wherein the solid, porous carrier, prior to contact thereof with the liquid in step (i), is heated at a temperature of about 100° C. to about 1000° C.

29. A catalyst composition of claim 28 wherein the solid, porous carrier is heated at a temperature of about 150° C. to about 850° C.

30. A catalyst composition of claim 29 wherein the carrier is heated at a temperature of about 800° C.

31. A catalyst composition of claim 30 wherein the heating is continued until the carrier contains about 0.5 to about 5 mmoles of the OH groups per gram of carrier.

32. A catalyst composition of claim 31 wherein the heating is continued until the carrier contains about 0.3 to about 0.7 mmoles of OH groups per gram of carrier.

33. A catalyst composition of claim 32 wherein the carrier is silica having a surface hydroxyl group concentration of about 0.5 mmols/gr, a surface area of 300 m²/gram and a pore volume of 1.65 m³/gram.

34. A catalyst composition of claim 33 wherein R is a $C_1$–$C_4$ alkane group and R' is halogen.

35. A catalyst composition of claim 34 wherein R' is bromine or chlorine.

36. A catalyst composition of claim 35 wherein the organomagnesium composition is ethylmagnesium chloride.

37. A catalyst composition of claim 36 wherein the liquid containing ethylmagnesium chloride is tetrahydrofuran.

38. A catalyst composition of claim 37 wherein said liquid is removed in step (ii) by evaporation.

39. A catalyst composition of claim 38 wherein the molar ratio of the organomagnesium composition to the number of moles of the OH groups on the carrier is about 1.1 to about 3.5.

40. A catalyst composition of claim 39 wherein the molar ratio of the tetravalent vanadium compound to the organomagnesium composition is from about 1 to about 10.

41. A catalyst composition of claim 40 wherein the molar ratio of the tetravalent vanadium compound to the organomagnesium composition is from about 3 to about 6.

42. A catalyst composition of claim 41 wherein the tetravalent vanadium compound is a vanadium halide.

43. A catalyst composition of claim 42 wherein the tetravalent vanadium compound is vanadium tetrachloride or vanadium tetrabromide.

44. A catalyst composition of claim 43 wherein the tetravalent vanadium compound is vanadium tetrachloride.

45. A catalyst composition of claim 44 wherein the solution used in step (iii) to contact the power of step (ii) further comprises a tetravalent titanium compound.

46. A catalyst composition of claim 45 wherein the molar ratio of the sum of the tetravalent vanadium compound and the tetravalent titanium compound to the organomagnesium composition is from about 1 to about 10.

47. A catalyst composition of claim 46 wherein the molar ratio of the sum of the tetravalent vanadium compound and the tetravalent titanium compound to the organomagnesium composition is from about 3 to about 6.

48. A catalyst composition of claim 47 wherein the tetravalent titanium compound is a titanium halide.

49. A catalyst composition of claim 48 wherein the tetravalent titanium compound is titanium tetrachloride or titanium tetrabromide.

50. A catalyst composition of claim 49 wherein the tetravalent titanium compound is titanium tetrachloride.

51. A catalyst composition for use in alpha-olefin polymerization reactions prepared in a process comprising the steps of:

(i) contacting a solid, porous carrier having reactive OH groups with a liquid, said liquid containing at least one organomagnesium composition having the empirical formula $$R_nMgR'_{(2-n)} \quad (I)$$

where R and R' are the same or different and they are $C_1$–$C_{12}$ hydrocarbyl groups, provided that R' may also be halogen, and n is 0, 1 or 2;

(ii) removing said liquid from step (i) to obtain a magnesium-containing carrier in the form of a dry, free-flowing powder, said dry, free-flowing powder containing a stoichiometric molar excess of the magnesium-containing compounds with respect to the OH groups originally present on said carrier; and (iii) contacting said powder of step (ii) with a solution comprising a liquid medium and at least one tetravalent vanadium compound, the number of moles of said vanadium compound being in excess of the stoichiometric amount thereof, said vanadium compound being soluble in said liquid medium, and said magnesium-containing carrier being substantially insoluble in said liquid medium, whereby a compound of vanadium which is insoluble in said liquid medium becomes incorporated onto said carrier.

52. A catalyst composition of claim 51 wherein the number of moles of said organomagnesium composition contained in said liquid used in step (i) is in excess of the number of moles of the OH groups on said carrier.

53. A process of claim 20 wherein the molar ratio of vanadium to titanium in the solution used in step (iii) to contact the powder of step (ii) is 0.01 to 99.

54. A process of claim 53 wherein the molar ratio of vanadium to titanium in the solution used in step (iii) to contact the powder of step (ii) is 0.1 to 10.

55. A process of claim 54 wherein the molar ratio of vanadium to titanium in the solution used in step (iii) to contact the powder of step (ii) is 0.2 to 5.0.

56. A catalyst composition of claim 45 wherein the molar ratio of vanadium to titanium in the solution used in step (iii) to contact the powder of step (ii) is 0.01 to 99.

57. A catalyst composition of claim 56 wherein the molar ratio of vanadium to titanium in the solution used in step (iii) to contact the powder of step (ii) is 0.1 to 10.

58. A catalyst composition of claim 57 wherein the molar ratio of vanadium to titanium in the solution used in step (iii) to contact the powder of step (ii) is 0.2 to 5.0.

* * * * *